US010228694B2

(12) United States Patent
Rodriguez

(10) Patent No.: US 10,228,694 B2
(45) Date of Patent: Mar. 12, 2019

(54) DRONE AND ROBOT CONTROL SYSTEMS AND METHODS

(71) Applicant: ANIMUSOFT CORPORATION, Miami, FL (US)

(72) Inventor: Daniel Rodriguez, Miami, FL (US)

(73) Assignee: Animusoft Corporation, Miami, FL (US)

(*) Notice: Subject to any disclaimer, the term of this patent is extended or adjusted under 35 U.S.C. 154(b) by 0 days.

(21) Appl. No.: 15/449,165

(22) Filed: Mar. 3, 2017

(65) Prior Publication Data
US 2017/0255198 A1 Sep. 7, 2017

Related U.S. Application Data

(60) Provisional application No. 62/303,828, filed on Mar. 4, 2016.

(51) Int. Cl.
B63G 8/00 (2006.01)
G05D 1/00 (2006.01)
G05D 1/02 (2006.01)
B63B 35/00 (2006.01)
B64C 39/02 (2006.01)

(52) U.S. Cl.
CPC ......... G05D 1/0088 (2013.01); G05D 1/0027 (2013.01); G05D 1/0274 (2013.01); B63B 2035/006 (2013.01); B63G 2008/002 (2013.01); B64C 39/024 (2013.01); B64C 2201/021 (2013.01); B64C 2201/108 (2013.01)

(58) Field of Classification Search
CPC .. G05D 1/0088; G05D 1/0027; G05D 1/0274; B63B 2035/006; B63G 2008/002; B64C 39/024; B64C 2201/021; B64C 2201/108
See application file for complete search history.

(56) References Cited

U.S. PATENT DOCUMENTS

2005/0187677 A1* 8/2005 Walker .................... B64C 13/20
701/16
2005/0258942 A1* 11/2005 Manasseh .............. G07C 5/008
340/425.5
2006/0106506 A1* 5/2006 Nichols .................. G05D 1/101
701/3

(Continued)

OTHER PUBLICATIONS

PCT International Search Report and Written Opinion, International application No. PCT/US/2017020683, dated May 23, 2017, 7 pages.

Primary Examiner — Russell Frejd
(74) Attorney, Agent, or Firm — Dorsey & Whitney LLP

(57) ABSTRACT

A system may be configured to manage at least one robotic device. The system may comprise one or more databases and one or more processors in communication with the one or more databases. The one or more processors may be configured to provide an operating system for the at least one robotic device, control motion of the at least one robotic device, configure at least one sensor removably coupled to the at least one robotic device, process data collected by the at least one sensor, and/or perform localization and/or area mapping for the at least one robotic device by comparing data collected by the at least one sensor with data in the one or more databases to generate localization and/or area mapping data.

24 Claims, 33 Drawing Sheets

(56) References Cited

U.S. PATENT DOCUMENTS

| | | | | |
|---|---|---|---|---|
| 2007/0129855 A1* | 6/2007 | Coulmeau | ............ | G08G 5/0039 |
| | | | | 701/3 |
| 2007/0208442 A1 | 9/2007 | Perrone | | |
| 2008/0033604 A1* | 2/2008 | Margolin | ............. | G05D 1/0044 |
| | | | | 701/2 |
| 2015/0104002 A1 | 4/2015 | Holman | | |
| 2015/0258683 A1 | 9/2015 | Izhikevich et al. | | |
| 2015/0336667 A1* | 11/2015 | Srivastava | ............ | B64C 39/024 |
| | | | | 701/2 |
| 2015/0365159 A1* | 12/2015 | Bosworth | ............ | G08G 5/0069 |
| | | | | 455/11.1 |
| 2016/0140851 A1* | 5/2016 | Levy | .................... | G08G 5/0069 |
| | | | | 701/3 |
| 2016/0253907 A1* | 9/2016 | Taveira | .................. | G08G 5/006 |
| | | | | 701/3 |

\* cited by examiner

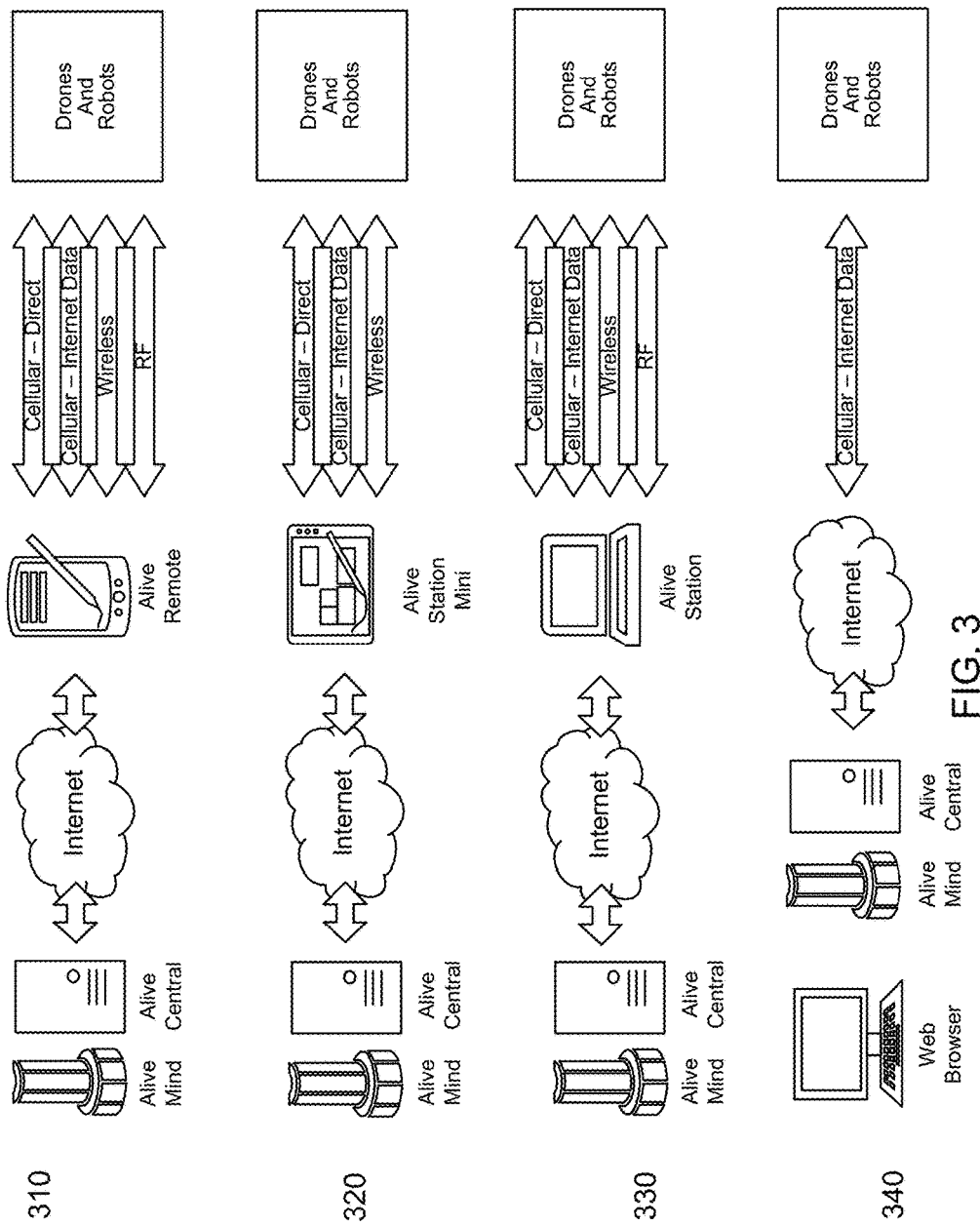

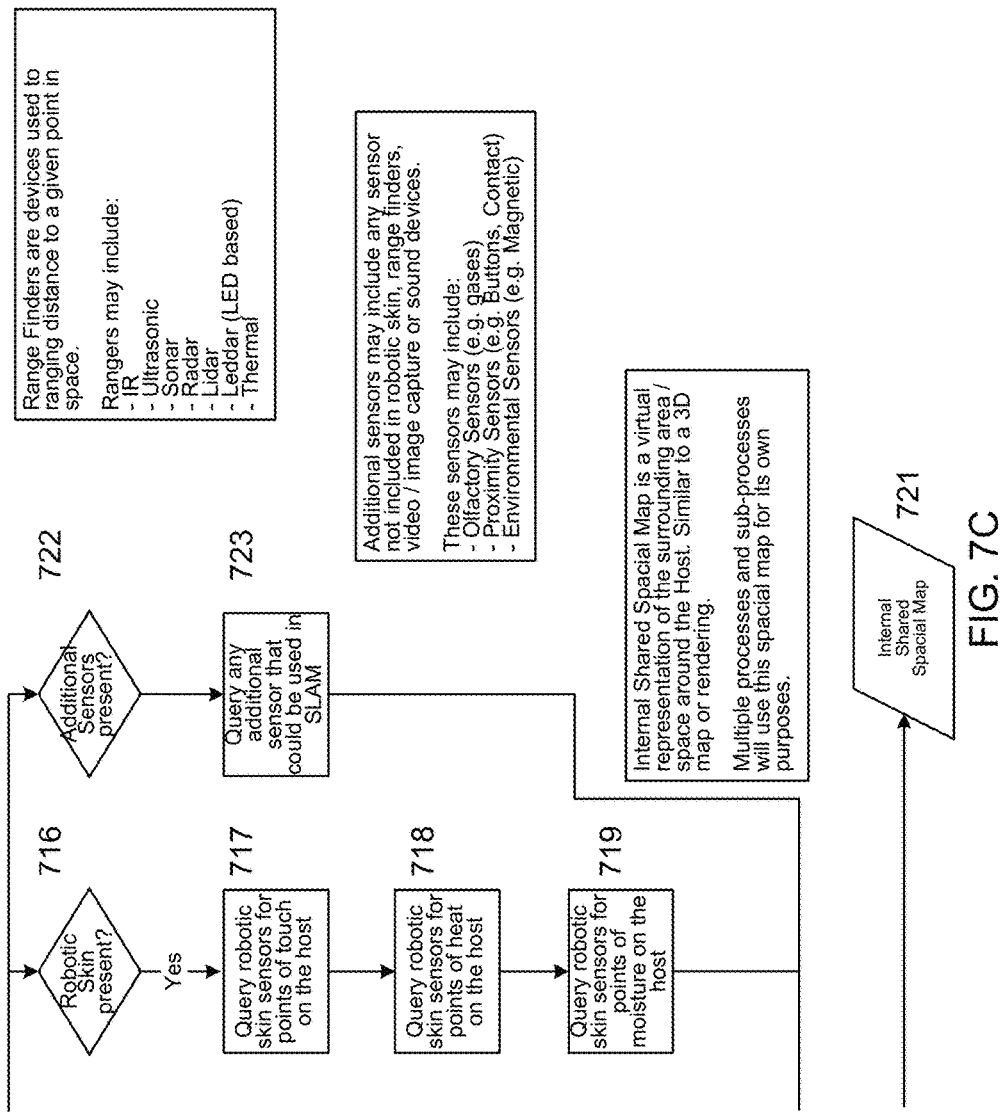

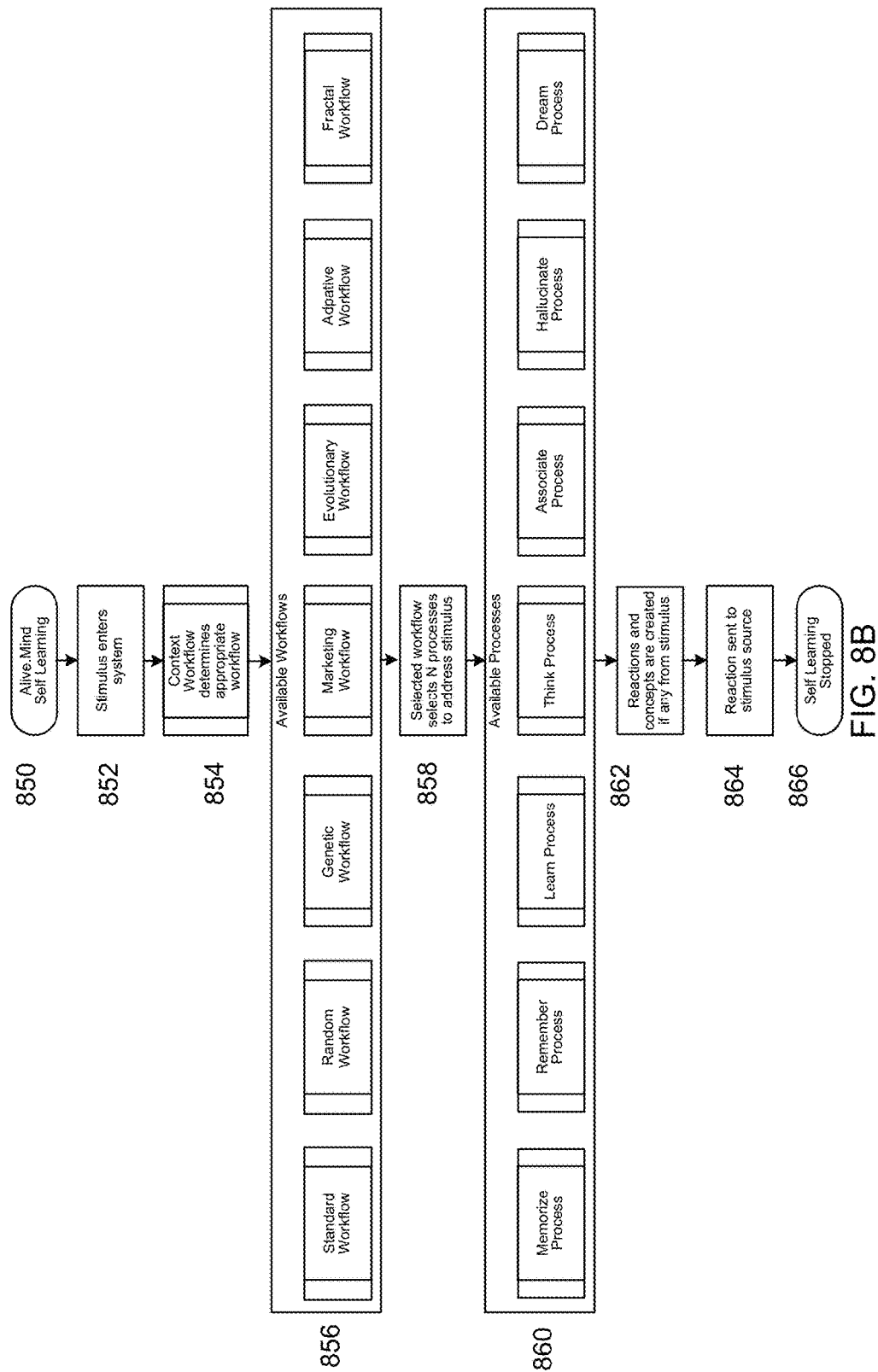

DRONE AND ROBOT CONTROL SYSTEMS AND METHODS

CROSS-REFERENCE TO RELATED APPLICATION

This application claims the benefit of priority to U.S. Provisional Patent Application No. 62/303,828, filed Mar. 4, 2016, and is incorporated by reference in its entirety herein.

APPENDIX

An appendix, entitled "Appendix A," is filed herewith and incorporated by reference in its entirety herein.

BRIEF DESCRIPTION OF THE DRAWINGS

FIG. 3 illustrates example communications flows for cloud systems and devices according to an embodiment of the invention.

FIGS. 7B-7C illustrates a process of simultaneous location and area mapping for a drone or robot according to an embodiment of the invention.

FIG. 8B illustrates a machine self-learning process according to an embodiment of the invention.

DETAILED DESCRIPTION OF SEVERAL EMBODIMENTS

Figure 1A:
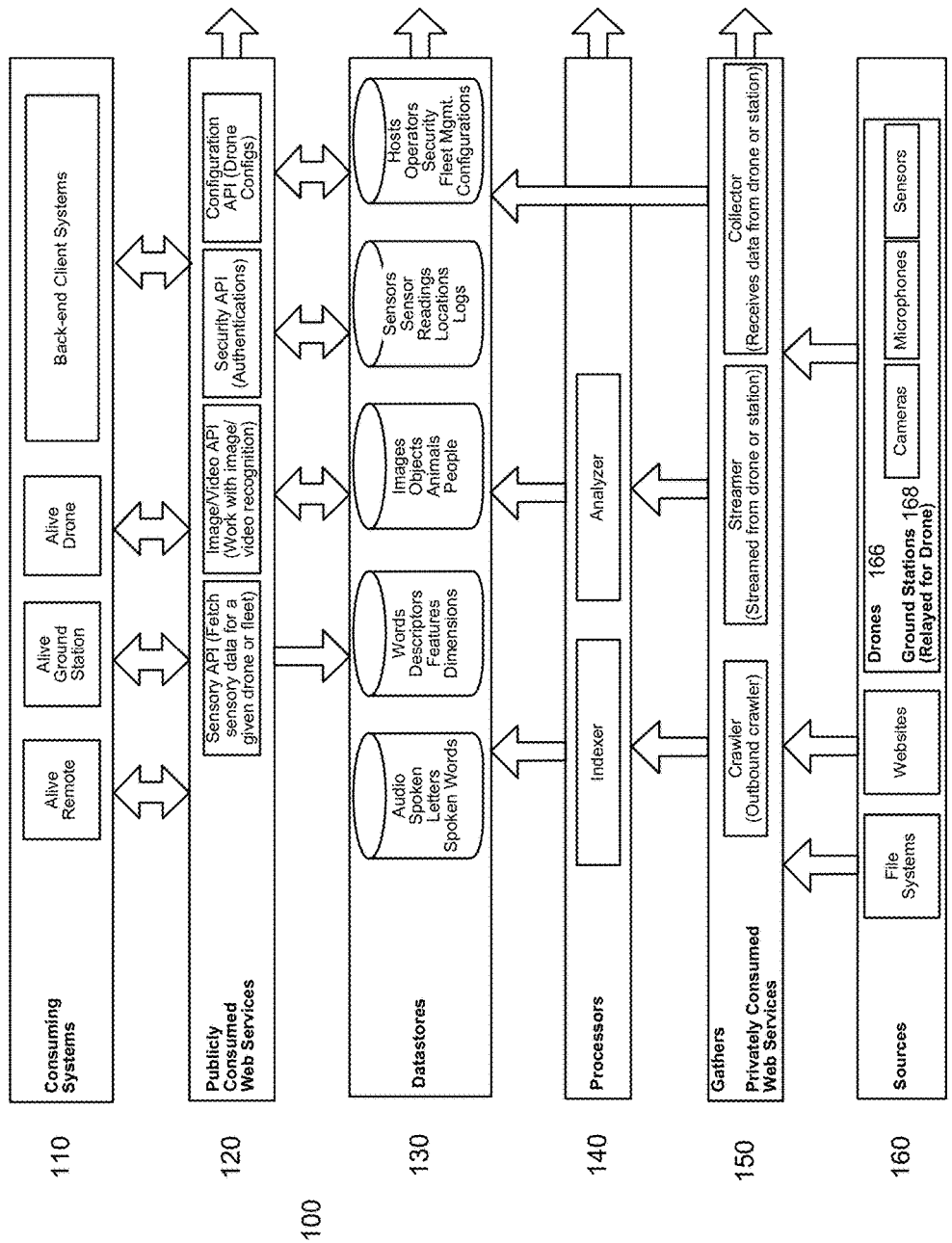
FIGS. 1A and 1B show example system/network architecture according to an embodiment of the invention.

Systems and methods described herein provide a complete software stack for drones and robots. The stack may include an edge computing platform to operate, manage, analyze, and integrate drones and robots into enterprises of all sizes. The stack may include one or more of the following components:
Alive DNA
Alive IDE
Alive Simulator
Alive Genome
Alive Remote
Alive Station
Alive Central
Alive Mind
Alive Integrate
Alive DNA Alive DNA is a software framework which provides the foundation of all elements described herein. Alive Genome, Remote, Station, Mind, and Central may be built upon this common foundation.

Alive DNA may provide at least the following features or a subset thereof:
Supporting commonly used hardware in the drones and robotics industry dynamically
Enterprise grade robust components for building distributed systems
Abstracts all low level hardware intrinsic into a high level programming API
Common functionality utilized by drones
Computer Vision
Object Detection (e.g. vehicles)
Facial Recognition
Motion—capable of handling the intrinsic of varying motion
Land, Air, Sea, and Space based motion
Wheeled, legged, tank treads, skis
Winged, multi-copter, air filled vehicles
Surface and submersible motion for sea based vehicles
SLAM—simultaneous localization and area mapping
Sensory Perception—ability to combine any amount of sensors to understand the surrounding environment
Video Streaming from multiple sources
Security for public safety
Generic patterns may be used to represent and work with robotic hardware.

Dynamic hardware devices (DHD) may eliminate the need for software drivers for specific hardware by fully encompassing the entire known universe of hardware components utilized within robotics complete with classifications, hardware definitions, firmware level instructions, and system integrations Simplified configuration of platforms may be provided using Plug-n-Configure-n-Go. Rather than hand coding configurations and specifics of a platform at the firmware level or elsewhere, the framework may include a simplified system driven by configurations built with a wizard. A Simplified Programming Interface may abstract all underlying hardware into an easy to use and simplistic programming interface that may be used to build functionality without knowledge of hardware details. Generic Firmware may be applicable to thousands of micro-controllers without the need to program specific micro-controllers while allowing the use of any of these controllers for any applications. Wizard based Firmware builder may automatically create, compile, build, and burn firmware to a controller based on given inputs without coding.

Drone rules of operation may dictate what a drone can and cannot do in the physical world. These rules may encompass concepts such as exclusion zones, inclusion zones, virtual highways, geo-fencing, altitude restrictions, hours of operation, operator use restrictions, and/or additional operational parameters (e.g. altitude, speed, platform, heading, agility). These rules may ensure that public safety issues are addressed while allowing organizations to safely operate drones on their work sites.

Robotic Vision packages may be included for functions such as object detection, facial recognition, people recognition, character recognition, etc. Robotic Hearing packages may be included to allow robots and drones to hear, locate sounds, understand spoken languages, etc. Robotic Skin packages may be included to allow robots and drones to feel heat and touch on the exterior shell using touch sensitive fabrics, for example. Robotic Smelling packages may be included to allow platforms to detect gases or any other olfactory function. Robotic Simultaneous Localization and Mapping (SLAM) packages may be included and may combine a distinct approach to SLAM where the combination of Vision, Hearing, Skin, and Smell merge to combine a cohesive 3D model of the world around it much like that of how humans perceive the environment.

Robotic UI (RUI) packages may be included for building user interfaces designed for robotics. We have come to know user interfaces as something graphic, however, in some embodiments within the realm of robotics, graphical is not always practical. RUI may provide a seamless interaction with the users of the drones and robots allowing ways of interacting with the platform in a human like way, e.g., sounds, words, hand gestures, eyes, and facial expressions combined with responses in the form of blips and beeps or unique distinct sounds combined with status lights. Moreover, should a display be available on the platform, then expressive mechanisms to display current state and responses may be implemented.

Random Number Generation (RNG) may be implemented using a similar technique to Robotic Slam where sensory data from the real world is used to generate random numbers. Random numbers may be useful for neural network and machine learning algorithms. In computer science, there are little to no methods for producing a truly random number. In some embodiments, the approach to random number generation used may mimic the living world in that information may be captured from the real world in order to produce randomized seed values for generating random numbers within a proprietary random number generator function.

Alive IDE

Alive IDE is an integrated development environment that may allow users to create software for drones and robots. Alive IDE may use a modified version of PyCharm by JetBrains. PyCharm is a Python IDE. PyCharm has been modified to allow for simplified development of software for drones and robots by providing wizards, tools, and integrations directly into the system.

Alive Simulator

Alive Simulator is a 3D virtual environment that may be built upon Unity 3D, for example. Unity 3D is a popular gaming engine. Some of the basic features of Alive Simulator may be as follows:

Dynamically change "maps". A map is a 3D virtual environment that models either the real or fantasy worlds (e.g. New York City, Pluto)

Dynamically add 3D models and meshes of particular drones or robots

Provide understanding of the drone/robot configuration and means of motion (e.g. walking, rolling, hovering, flying, and swimming)

Integrate with other system components

Allow developers to model their drones/robots and test their applications built with Alive DNA before building out any hardware Real time sensor feedback Real world maps and environments which may include fire, gases, smoke, sound, lights, objects, people, vehicles Complete test simulator for Alive Apps without having to build out any hardware Can be run stand alone or in debug mode when launched from the Alive IDE Completely renders and builds the drone/robot in a 3d environment according to the same configuration used by Alive OS to launch and run appropriately Supports land, air, sea, and space based drones/robots End users may customize maps as objects as needed End users may also leverage the Unity Asset store to enhance the simulator Alive Simulator interfaces with the Alive Remote directly allow users to test out drones with the remote control before building them Alive Genome Alive Genome is the operating system of the drone and robot. Alive Genome may be built upon a modern-day operating system (e.g., Linux). The operating system may be modified to support the core components of Alive Genome. Alive Genome may include the following components:

Runtime Process—the core engine of Alive Genome responsible for spawning and controlling all processes Updater Process—responsible for updating Alive Genome whenever definitions or new versions become available Remote Process—responsible for handling remote control features described herein Sensory Process—responsible for receiving, processing, analyzing sensory data collected by a drone or robot optionally transmitting that to Alive Central, Alive Mind, Alive Station, Alive Remote Video Process—responsible for handling video feeds from attached cameras on the drone or robot optionally transmitting that to Alive Central, Alive Mind, Alive Station, Alive Remote Beacon Process—responsible for notifying Alive Central of the current location, status, sensory information, etc. of the drone or robot at any given time Ping Process—responsible for handling "PING" requests from system components. A "PING" event may be similar to a standard PING in desktop/server/laptop computers which tests at a basic level if the drone or robot is active and responding Utility Process—responsible for utility functions to the drone or robot (e.g. no drone zones, virtual fencing, remote kill switching)

Navigation Process—responsible for the primary functions of navigating in a given space Alive Station, Alive Remote, or Alive Kill Switch. This component may reduce or remove the need for complicated customized remote control systems and devices currently used in the market by leveraging the wide spread use of smart phones, tablets, and laptops combined with installed applications Hive/Swarm Processes—allows hosts to work collectively for common goals (e.g., finding a missing person)

Guardian Processes—responsible for securing actions performed by the host including watching all incoming and outgoing messages Launcher Processes—responsible for loading, launching, stopped, restarted Alive Apps installed on the host Iris Processes—responsible for video and image capture as well as performing Robotic Vision while aiding Robotic Slam Auricle Processes—responsible for sound/audio capture as well as performing Robotic Hearing while aiding Robotic Slam Olfactory Processes—responsible for olfactory sensors capable of reading the environmental conditions surrounding the host/drone. For example, olfactory processes may be used for determining specific gases in the atmosphere.

Touch/Proximity Processes—responsible for any touch and/or proximity sensing around the host/drone. This process appends additional awareness to SLAM underlying functions.

Contextualization Process—responsible for contextualizing the real world around the host/drone. This process aids in robotic SLAM as well as advanced analytics/reporting metrics used by the system to perform its tasks.

Motion Process—responsible for the motion of the host and anything related with motion in the real world including entire host motions as well as parts of the host motion (e.g. a robotic arm), for example.

Host Admin—a secure web based application used to administer the host.

The application may allow users to quickly create, change remove configurations, view system logs or application logs, monitor system processes, Alive specific processes, real time sensor data, and more. The operating system may be configured to run stand alone on a single PC, SBC, or embedded PC, for example. Alternatively, components may be scaled out and distributed to work across computers and servers either running on the platform itself or off the platform (e.g., in the cloud, local network).

The operating system may be built to enterprise grade quality complete with best practices for system design, coding guidelines, security, secure communications, and virus protection. Moreover, the system may be designed around the concept of a distributed messaging architecture. This architecture allows the system to scale to a great size as well as allowing 3rd party components to be utilized such as a service bus or message queues. Furthermore, the Alive Genome benefits from all the capabilities one would expect with this architecture (e.g., well defined and formatted messages—JSON/XML).

Alive Remote

Alive Remote is a mobile application built for mobile devices such as mobile phones and tablets. Alive Remote may simplify the user interface and experience when operating a drone or robot manually. Alive Remote may provide at least two specific user interfaces. One user interface is for ground and surface vehicles such as cars and boats. The latter is designed for aerial and submersible vehicles. Alive Remote may run on Android, IOS, and Windows based devices, although other devices may also be used.

Alive Station

Alive Station is a desktop application that runs on a laptop or other computer. This desktop application may allow users to control a fleet of drones. Alive Station may be integrated with the other components described herein. Alive Station may support the following features:

Mapping
Navigation
Status of the drone or robot
Remote controlling
Tasking a drone or robot for specific tasks (e.g. capture video over a given area and run autonomously)
Act as a proxy to Alive Central and Alive Mind in the cases where connectivity is an issue
A smaller version of Alive Central and Alive Mind are within the Alive Station to provide further abilities to all types of drones and robots such as:
Computer Vision
Navigation
Mapping
Surveying
Surveillance
Search and Rescue Alive Station supports
Rally Points—a rally point is a point where the robot or drone stops for any given reason (e.g., to change batteries).
Way Points—a way point is a virtual point on a map. A path may be set up by the operator for the drone or robot to navigate over. Unlike rally points, a way point is passed through and not stopped on.
PSR—the station indicates the point of safe return. Alive Station calculates how power is being used, how much power is left, and how far the drone or robot can go before being unable to return to home. Once this is performed, the station indicates on a map an area where the drone or robot can travel and still return home.
Trip plans—drones and robots may have a plan. A plan is similar to a flight plan for an airplane.
Survey types
Land based surveys
Sea based surveys (e.g. underwater and surface surveys)
Air based surveys
Space based surveys
Multi-dimensional data/imagery capture surveys
Autonomous surveys
Manual surveys
Real world situational awareness
Contextual user interfaces which adapt to the different models, brands of drones (hosts) as well as the types of control interfaces they required which differ between land, sea, air, and space based platforms Alive Central Alive Central is a web based application running on a server and accessible in a cloud or network. It is the central point where all drones and robots can be accessed, controlled, tasked, updated, and secured.

Alive.Central may allow organizations to centrally operate and manage any drone connected to the system. Alive Central may provide a gateway to performing advanced analytics and reporting over the data collected by the hosts/drones.

Alive.Central may allow for training the Alive.Mind by means of a simplified user interface and experience where users create their own sets of training data used to train the Alive.Mind for future processing of data collected by drones.

Alive Central may provide a gateway into the Alive Cloud API and Alive Mind. Alive Central may integrate with over 300 $3^{rd}$ party systems to allow organizations to integrate their drones into their enterprise. The categories of systems Alive Central integrates with may include the following:

A/B Testing
Advertising
Analytics
Attribution
CRMs
Customer Success
Deep Linking
Email
Error and Performance Monitoring
Heat maps and Recordings
Help desks
Live Chat Personalization
Push Notifications
Raw Data
Real time Dashboards
Referrals
SQL
Surveys
Tag Managers
Data Warehousing
Big Data
Machine Learning
Direct API access
   Custom integrations to external enterprise systems (e.g. building information modeling (BIM), content management system (CMS), enterprise resource planning (ERP), consumer relationship management (CRM), fleet management software (FMS), etc.) commonly used across industries or within industries (e.g. infrastructure, architecture, construction, engineering, agriculture, law enforcement, military, etc.)

Alive Mind

Alive Mind is a machine learning engine running on a server and accessible in a cloud or network. Alive Mind may provide a central point where data from drones and robots may be sent for processing, analysis, reporting, and learning. For example, Alive Mind can be used to process video streams of farm lands detecting what portions of the farm are infected with a given disease. Alive Mind may run partly in Amazon Cloud as well as on highly specialized servers configured specifically for machine learning, for example. The machine learning servers may contain 20,000 processing cores, for example, which may be tasked for learning quickly leveraging deep learning, neural networks, graph databases, document databases, relational databases, and knowledge base artificial intelligence. Alive Mind may be capable of integrating with 3rd party machine learning tools such as IBM Watson API, Google AI, and Facebook AI, for example.

At its most basic, Alive Mind may handle data at the byte level and may not differentiate between video, images, sound, text, or any other type of data. Alive Mind may be trained based on byte patterns within sequences of bytes and its categorized as such. Moreover, Alive Mind may continue to evolve and learn on its own with proprietary self-learning recipes/algorithms specific to the data at hand. This may improve Alive Mind's accuracy over time and may serve the problems addressed with machine learning. Alive Mind may leverage many commonly used computer vision techniques to assist in distilling information from imagery.

Alive Mind may leverage neural networks of varying types combined with genetic algorithms combined with an ever-growing vast data store to assist with analysis and reporting of real world data. This may assist in the process of contextualization of the real world into actionable results.

Additional Features

The Alive Kill Switch may allow any drone running Alive OS to be remotely shut down by their operator. The Alive Kill switch can be seen on Alive Central, Alive Host Admin, Alive Command Center, Alive Remote, as well as a smart watch application linked to the Alive Remote. The Alive Kill Switch may be a software kill or, if installed, a hardware kill. In both cases the Alive Kill Switch may make every attempt to halt the drone/robot in its tracks.

Drones and robots may sometimes need a mobile solution when out on the field controlling one or more platforms. The Alive Ground Station is a software application designed for computers and laptops that may allow users to easily manage, control, administer, and task drones as required.

Alive Cells (Apps) are applications which are designed to run with Alive ecosystem. These applications may be built using the Alive DNA, Alive IDE, Alive Simulator and uploaded to the Alive Cell (App) Store for sale. Example service offerings may include a variety of applications for various industries including Agriculture, Mining, Infrastructure, Law Enforcement, Healthcare and Logistics. The Alive system may allow a user to write apps to perform given functions, and the functions may be translated into robot and drone control commands via the Framework, IDE, Simulator, etc., as described above. Some or all of the following example apps may be included with the system, although other apps are also possible.

Weather Man is an Alive Cell designed to be used by farmers requiring detailed metrics gathering for their farms in real time. These metrics may be used during harsh weather conditions so farmers may better understand the weather conditions and respond accordingly to the weather to ensure the longevity of their crops. Weather Man may patrol given farms and regions autonomously while providing real time sensory data which may include the following data points:
   Temperature
   Wind Speed
   Humidity
   Pressure
   UV Levels Courier is an Alive Cell designed to be used for logistics. Courier may integrate with the Alive Central, Alive Geome, Alive Station to enable any drone/robot capable of a payload with the ability to delivery shipments to a destination.

Security Guard is an Alive Cell designed to be used by any organization that requires security for a given area. The organizations may include offices, parks, and farms, for example. Security Guard may be used indoor or outdoor. Security Guard may be capable of autonomously roaming the said space searching for triggers in the environment. Triggers may include:
   The presence of people, animals, vehicles
   Specific people in the wrong areas
   Motion and sound alerting These triggers may be set to notify a person or people when the trigger is fired. One example set of users of this application will be Farmers. Farmers have the need to patrol their farms during the busy season when the most theft occurs. Drones patrol their farms searching for people or vehicles in their farms. Once people or vehicles are found, the farmers are notified enabling them to take proper action.

Rail Inspector is an Alive Cell designed to inspect railroad tracks and other equipment. A ground based drone (UGV) may be dispatched to inspect a section of rail. The UGV may be equipped with a ground-penetrating radar (GPR) and tasked to traverse the rail. Rail Inspector may be designed to automatically detect potential faults and problems based on known errors. Furthermore, the Rail Inspector can be fed data of known readings related to problems and identify them as such when encountered. Rail Inspector may mark the segments it finds as potential problems so that an actual human inspector can go back and review these parts manually. Users may inspect these problem areas virtually with the saved video feeds from the drones as well as review the GPR data gathered by the drones alongside the video feed for better assessment.

Pipeline Inspector is an Alive Cell that operates much like the Rail Inspector Alive Cell. The main difference is that this app is designed to detect potential faults in oil pipelines as well as take readings from gauges on platforms.

Fleet Tracker is an Alive Cell designed to track and maintain inventory counts of fleet vehicles. Fleet Tracker is designed for land and air based drones. Using Alive Robotic Vision combined with Alive SLAM, Fleet Tracker may be capable of detecting vehicles, uniquely identifying each vehicle and tracking its location/position precisely using GPS coordinates.

Border Patrol is an Alive Cell designed to monitor borders where security is of utmost importance. Border Patrol may be similar to Security Guard down to nearly every aspect. There are two differences between Security Guard and Border Patrol. First, Border Patrol may include information on International air space rules and adhere to them appropriately. Secondly, Border Patrol may be designed for Law Enforcement Professionals providing tools that may not be available to users of Security Guard. For example, Border Patrol may allow Law Enforcement Professionals to store known criminals and search for these criminals on the border as part of their sweep. Moreover, Border Patrol can be used for land, sea, air, or space based drones.

People Finder is an Alive Cell designed to search for a given person from known video streams connected to the Alive Cloud services. If used against a set of known active drones patrolling a given region, People Finder can locate a designated person and provide coordinates to the person's whereabouts in real time. This application may be useful for law enforcement in cases such as escaped convicts and missing person(s) (children).

Object Finder is an Alive Cell that works similar to People Finder. The difference here is that Object Finder may be used for finding objects in the world, not just people. This may be useful for fleet management, inventory control, and organizations with large campuses, for example.

Alive Host Admin is a web based administration portal that runs on the actual drone/robot. It may be used to administer the drone. The following are examples of the items that can be performed through the Alive Host:
  Restart Processes
  Reboot the host
  Rename the host
  Check CPU, Memory, Disk, Network I/O metrics
  Authorize operators
  Update configurations
  View Application and System logs
  View sensory data
  Real time dashboard of the host
  Vision, Sound, Smelling, and Touch are directly accessible Alive Command Center is a multi-tenant web site designed to be used by enterprises with fleets of drones. Alive Command Center may allow users to perform the same tasks found in Alive Central, except that it may include more robust and specific tasks. Tasks may include:
  Fleet management logistics
  Fleet management for inventory
  Fleet management for law enforcement Alive Command Center may act as the central administration website for the Alive system. Alive Command Center may allow admins to easily administer accounts, hosts, and operators for all customers.

Alive Web Services may expose all the underlying layers of the Alive system. Alive Web Services may allow organizations to easily integrate with the Alive system and pull data into their existing systems for analytics, metrics, and monitoring. In some embodiments, the Alive Web Service is a complete RESTful API secured with credentials and SSL.

The Alive Cell Store is a website that works much like an Apple App Store or Google Play Store in that developers may upload their own apps written for Alive platform and sell them to the open market.

The system may include a complete data store for defining hardware. The data store may allow users or admins to dynamically configure any hardware device that may be used within the platform. The data store may be used by any of the system components described herein.

Some example data store elements may be as follows:
  SENSORS—A complete log of all sensory information gathered from every host connected to the system running Alive OS. This includes any data gathered from any device connected to the hardware of a drone. It may include any of these types of readings but in no way is it limited to this list:
    Images
    Video
    Sounds
    Speech
    Objects
    GPS coordinates
    Temperature
    Gases
    Pressure
    UV Readings
    Light
    Water flow
    Wind speed/direction
    Proximity
  TRACKING—The Tracking data store keeps tracking of every drone connected and running Alive OS complete with the current operator and all known locations of the drone.
  WORDS—A data store containing every word in known languages. This is used and tied in with Alive Slam (Robotic Slam). The current word count includes the entire English language with over 1M words. The data store contains the following items but is not limited to these items:
    Word
    Definition
    Spoken Audio File of the Word
    If the word is a Noun then
      Average dimensions (i.e. apple=3 in×3 in×3 in
      Minimum 3 images for the word (i.e. a picture of an apple)
  IMAGES—A data store containing images for words, objects, people, animals, places, vehicles, or any other category. It is generally linked to by other data stores like words.
  PEOPLE—A data store containing Meta data on people that were encountered by a drone or found publicly on the Internet. The Meta data may include the following:
    Name
    Address
    Profession
    Employer
    Email
    Phone
    Date of Birth
    Social Media Links (i.e. linked in, Facebook, google+, Instagram)
    Images ANIMALS—A data store containing every known animal. The Meta data collected and stored for this may include the following items:
Name
Genus
Description
Dimensions
Lifespan
Geographic Region
Images
Sounds SOUNDS—A data store containing known sounds found in the real world. This may be linked to objects, animals, and people. This data store may be built up over time and collected by drones running Alive OS.

LOCATIONS—A data store for geographic locations. This may be used for general purposes within the system and may be cross referenced by many data stores and systems. Items may include:
Country
City, State, Province
Postal Code, Country Code
Longitude/Latitude coordinates DRONE ZONES—A data store that defines the inclusion/exclusion drone zones based on geographic regions and the Locations data store.

VIRTUAL HIGHWAYS—A data store that defines virtual highways through geographic regions.

CONTEXTUALIZATION—A data store of free flowing learned knowledge graphs stored in a proprietary construct which may be specialized to the fast absorption of information as well as searching and accessing information within the data store. This information contained in the data store may be generated autonomously by the system as it interacts with real world data. The contextualization data store may be the memory for concepts such as:
Self-learned words, sentences, phrases, agnostic to language
Self-learned concepts from imagery (e.g. two people having a conversation vs. two people arguing)

These data store categories are provided as examples only, and many others may be possible.

System Architecture

In some embodiments, the features described above may be provided by computers and/or processors executing computer program instructions. A computer may be any programmable machine or machines capable of performing arithmetic and/or logical operations. In some embodiments, computers may comprise processors, memories, data storage devices, and/or other commonly known or novel elements. These elements may be connected physically or through network or wireless links. Computers may also comprise software which may direct the operations of the aforementioned elements. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein may be interchangeable for some embodiments.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, 4G, or other wireless connections). Connections between computers may use any protocols, including connection-oriented protocols such as TCP or connectionless protocols such as UDP. Any connection through which at least two computers may exchange data can be the basis of a network.

Figure 1B:
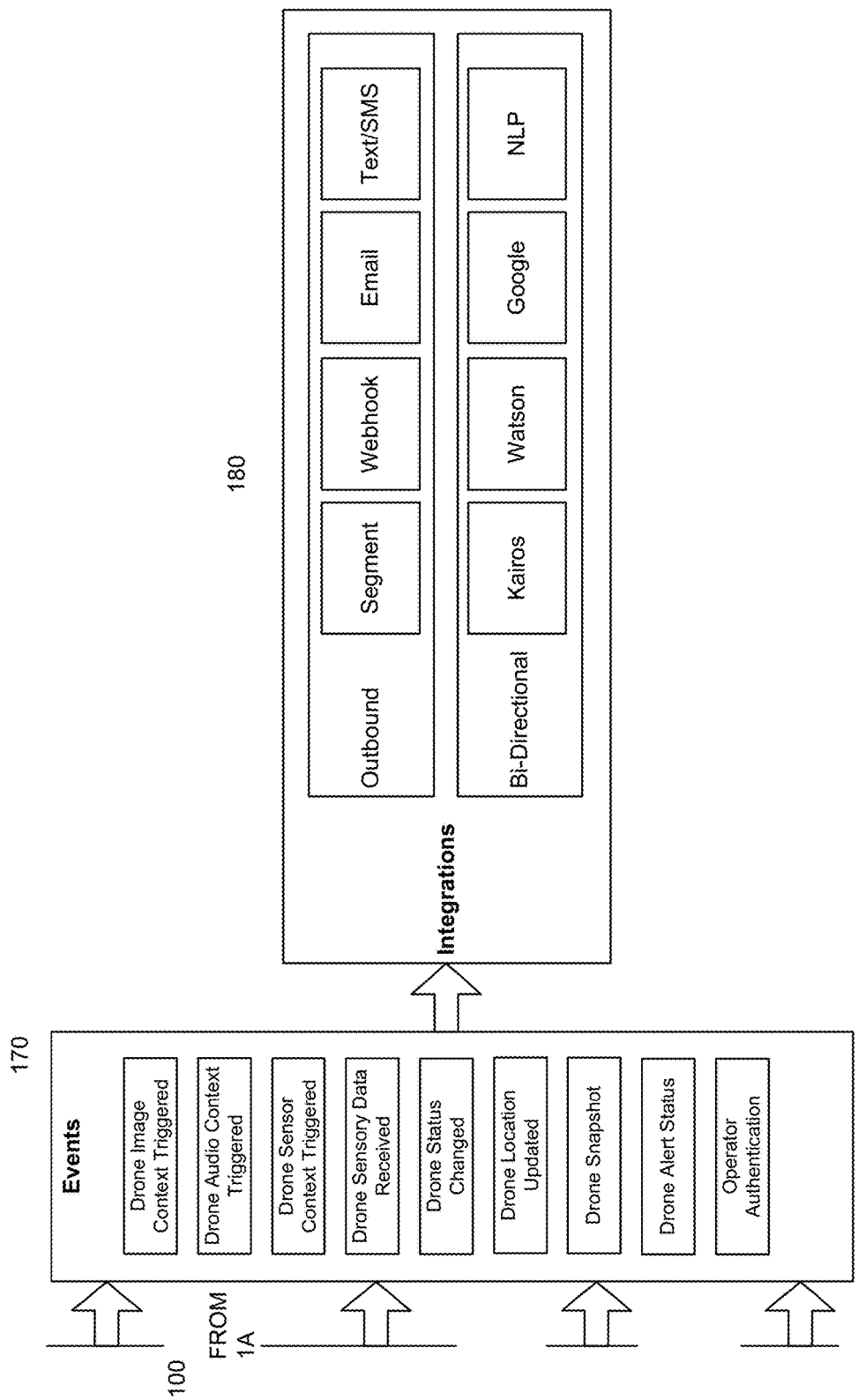

FIGS. 1A and 1B show example system/network architecture 100 according to an embodiment of the invention. Architecture 100 may be implemented by one or more computers (e.g., servers) and/or one or more drones communicating with one another over a network (e.g., the internet or a private network).

Architecture 100 may include consuming systems 110 (e.g., Alive remote 112, ground station 114, drone 116, and/or back end systems 118). Consuming systems 110 may provide the end-user functionality for robot control discussed above. These elements may communicate bidirectionally with the Alive system via network connections. For example, the Alive system may include one or more APIs 120 (e.g., sensory API for fetching sensory data from a given drone 116 or fleet of drones 116, image/video API for receiving and/or recognizing image/video data, security API for authentications, and/or configuration API for drone 116 configuration). These APIs 120 may facilitate the exchange of data between consuming systems 110 and Alive datastores 130, some examples of which are described above.

Data sources 160 may feed data to the system via network connections. Such data sources may include external file systems 162 and websites 164 as well as drones themselves, which may be equipped with sensors 166, or ground stations 168 in communication with the drones which may receive drone sensor data and forward it to the system. The publicly consumed web services and privately consumed web services may interface with the sources and consuming systems to facilitate communication with the alive system at large (e.g., through a variety of APIs and/or data gatherers). Gatherers 150 (e.g., crawlers for crawling web data, streamers for receiving streamed drone data, and/or collectors for receiving forwarded drone data) may take in data from data sources 150. Processors 140 may, in some cases, process the data from gatherers 150. The processed or raw data from gatherers 150 and/or processors 140 may be stored in datastores 130. Data indexer and analyzer processors 150 may interact with datastores 130 to perform processing of data gathered by drones and/or commands from consuming systems and thereby provide the features described above (e.g., machine learning/analysis of the gathered drone sensor data, etc.).

The system may process a variety of events that may be triggered by drone and/or user actions. Example events 170 are shown in FIG. 1B. In response to receiving data about an event (e.g., drone image context triggered), integrations processor 180 may perform processing in either an outbound (e.g., send image to a user via email) or bi-directional (e.g., use Alive Mind to analyze crop images and direct the drone to gather more data) manner.

Figure 2:
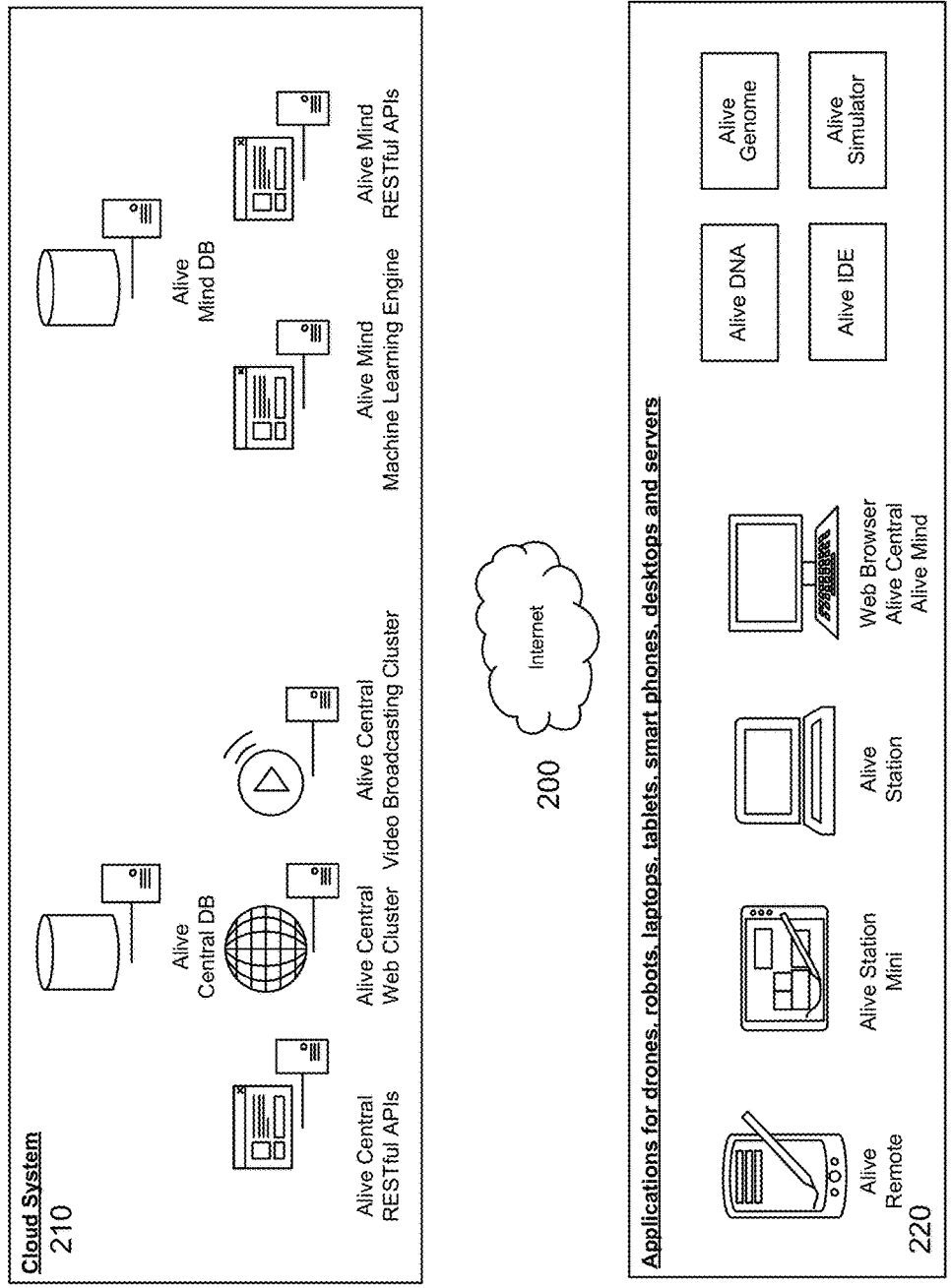
FIG. 2 shows how system elements may be distributed among network devices according to an embodiment of the invention.

FIG. 2 shows how system elements may be distributed among network devices according to an embodiment of the invention. In this example, the devices communicate with one another over the Internet 200.

For example, several components may be provided by cloud systems, or central systems that are accessible via the internet or another network. Cloud systems 210 may include database, API, and/or processing elements described in FIG. 1A-1B and elsewhere above (e.g., Alive APIs, web cluster, broadcasting cluster, machine learning engine, and databases). Central processors may provide central RESTful APIs, web clusters, and/or video broadcasting clusters utilizing data stored in a central database. These central cloud systems may provide the Alive Central features described above, for example. Mind processors may provide machine learning engines and RESTful APIs utilizing data stored in a mind database. The mind cloud systems may provide the Alive Mind features discussed above, for example.

A variety of devices may connect to the cloud systems via the internet or another network. Local systems 220 may include devices equipped with applications for interacting with cloud systems 210 as discussed above. For example, user devices (e.g., remote, station, and/or browser-equipped computers) may receive user commands and display data for user consumption. For example, Alive Remote hardware, firmware, and software may be supplied within a mobile device such as a smartphone or tablet. Alive Station hardware, firmware, and software may be supplied within a mobile device or computer, for example. Also, devices configured for web interaction (e.g., via a browser application) may be able to access the cloud systems through browser-based interfaces. Drones may be configured with hardware, firmware, and/or software performing processing discussed above (e.g., alive DNA, genome, IDE, and/or simulator, among others). Within robots and/or drones themselves, hardware, software, and firmware for Alive DNA, Alive Genome, Alive IDE, and/or Alive Simulator features may be provided and may interact with the cloud systems via the internet or another network. These devices may also communicate directly with one another.

FIG. 3 illustrates some example communications flows for the various cloud systems and devices described above. In flow 310, drone may communicate with local device (e.g., alive remote) using any of a plurality of channels (e.g., direct cellular connection, cellular internet, wireless connection such as Bluetooth or WiFi, or RF). Local device may communicate with cloud system using the Internet. In flow 320, drone may communicate with local device (e.g., alive station) using any of a plurality of channels (e.g., direct cellular connection, cellular internet, or wireless connection such as Bluetooth or WiFi). Local device may communicate with cloud system using the Internet. In flow 330, drone may communicate with local device (e.g., alive station) using any of a plurality of channels (e.g., direct cellular connection, cellular internet, wireless connection such as Bluetooth or WiFi, or RF). Local device may communicate with cloud system using the Internet. In flow 340, drone may communicate with cloud system using the Internet. Local device may communicate with cloud system using the Internet as well (e.g., through a browser-based interface). These flows are presented as examples only, and it will be appreciated that other embodiments may use other combinations of communication channels and/or data flows.

Figure 4A:
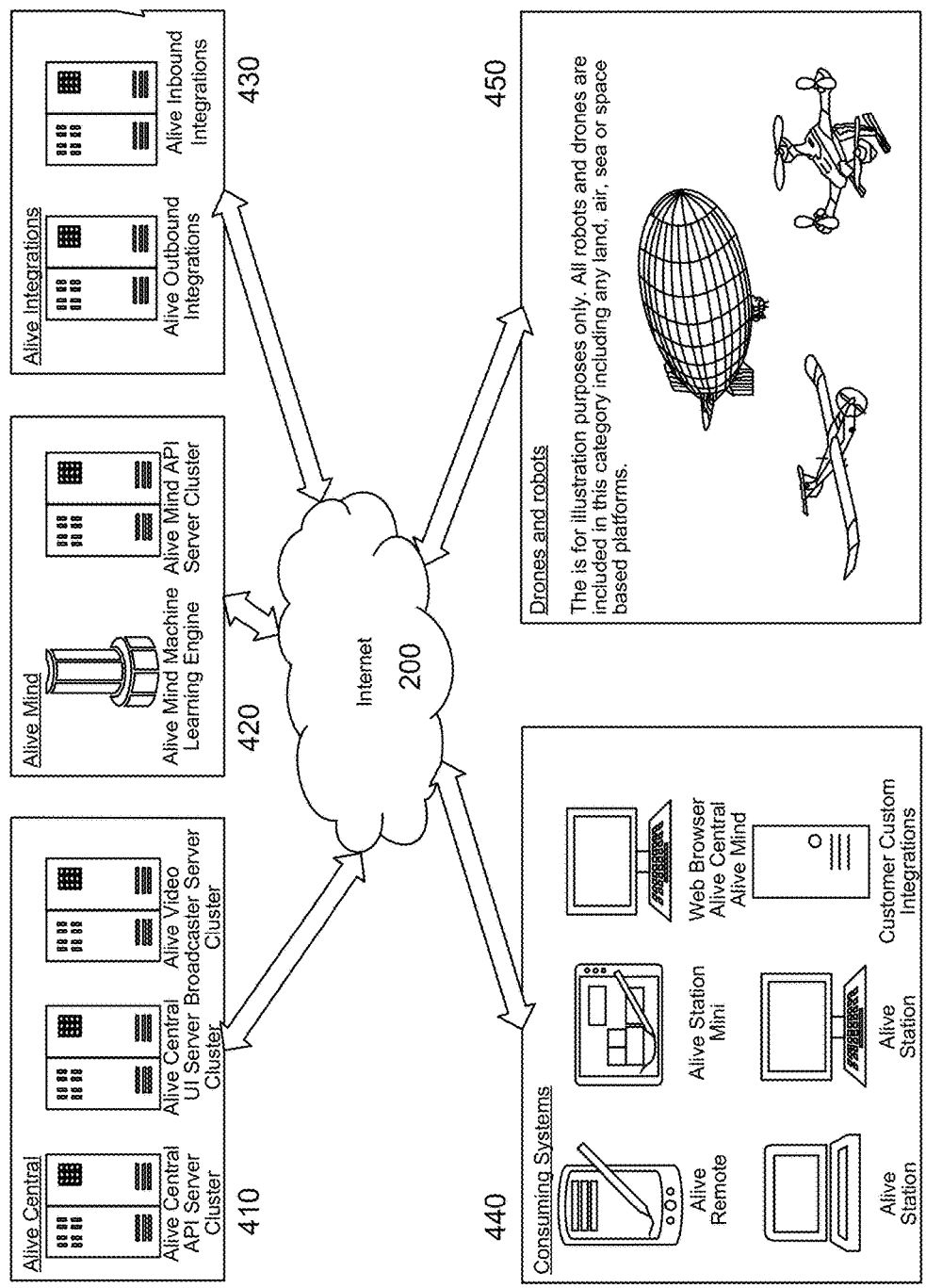
FIGS. 4A and 4B show example server/hardware configuration and third party system integration according to an embodiment of the invention.
Figure 4B:
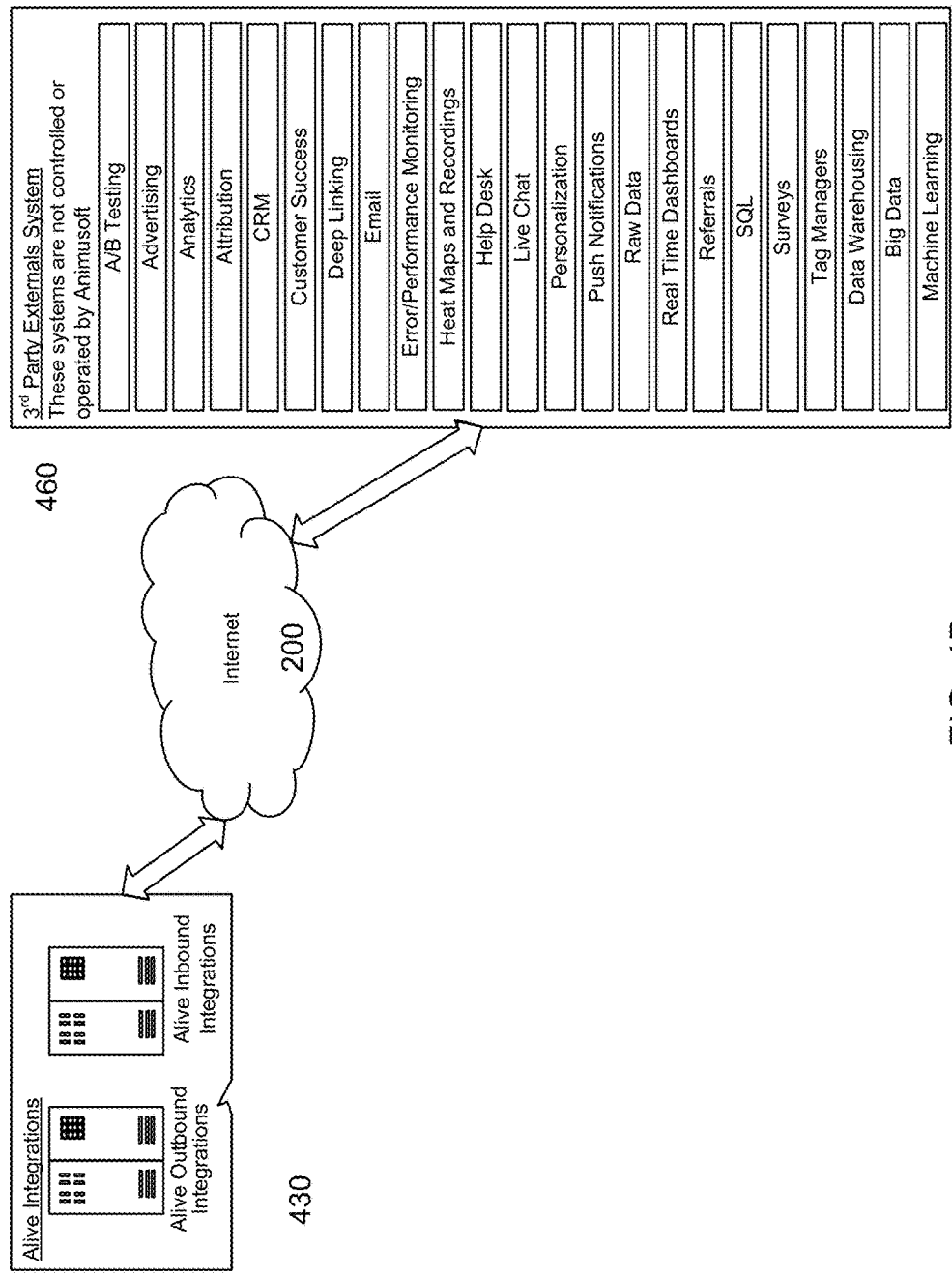

FIGS. 4A and 4B show a specific example of system server/hardware configuration and third party system integration according to an embodiment of the invention. While certain features are illustrated as provided by certain servers in this illustration, other configurations may be possible. In this example, alive central features (discussed above) may be provided by alive central server(s) 410. Alive mind features (discussed above) may be provided by alive mind server(s) 420. Alive integrations features (discussed above) may be provided by alive integrations server(s) 430. These servers 410, 420, 430 may be configured to communicate with one another directly and/or using the Internet 200. Local device(s) 440 and drones 450 may communicate with the servers 410, 42, 430 using the Internet 200.

Alive integrations server 430 may integrate third party services 460. In some embodiments, alive integrations server 430 may communicate with third party service providers (e.g., separate servers) using the Internet 200. Some example third party services 460 that may be integrated in this manner are shown in FIG. 4B, although others may be possible in some embodiments.

System Processes

Figure 5A:
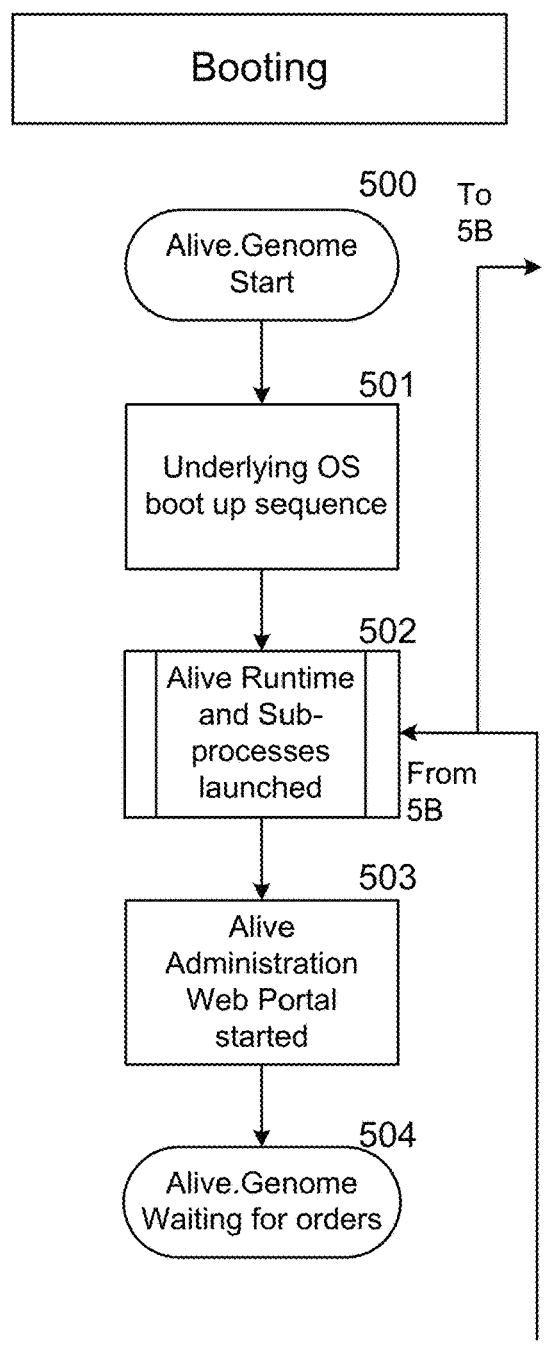
FIGS. 5A-5P illustrate a boot process for initializing and launching system components according to an embodiment of the invention.
Figure 5B:
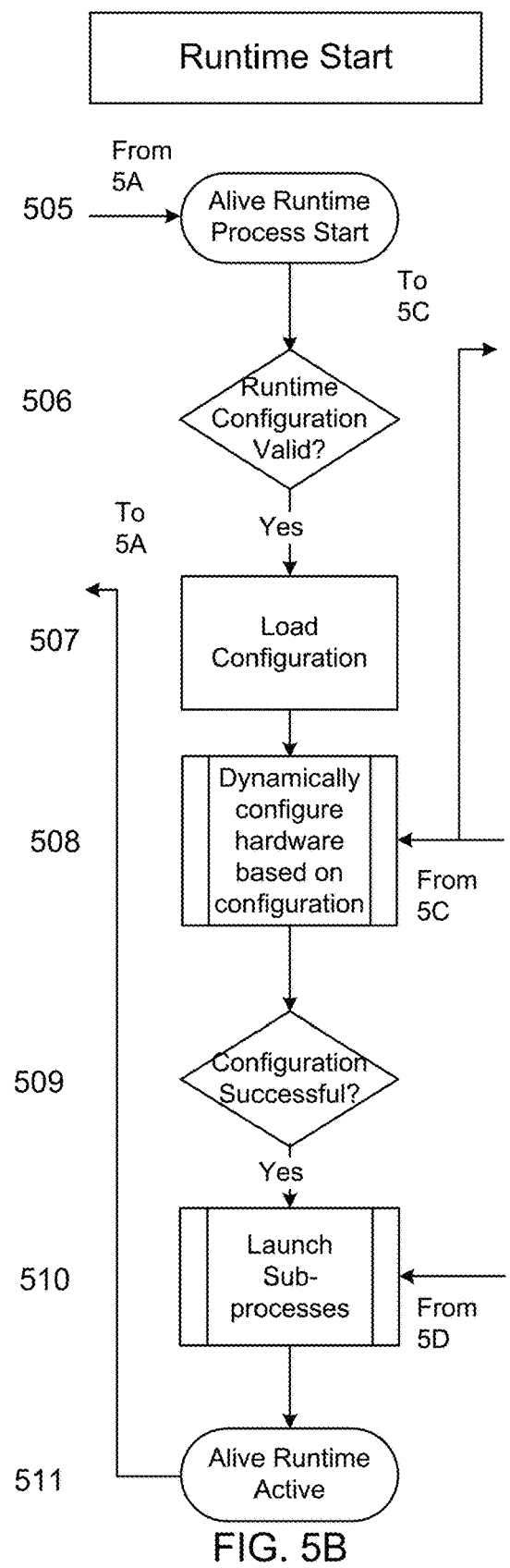
Figure 5C:
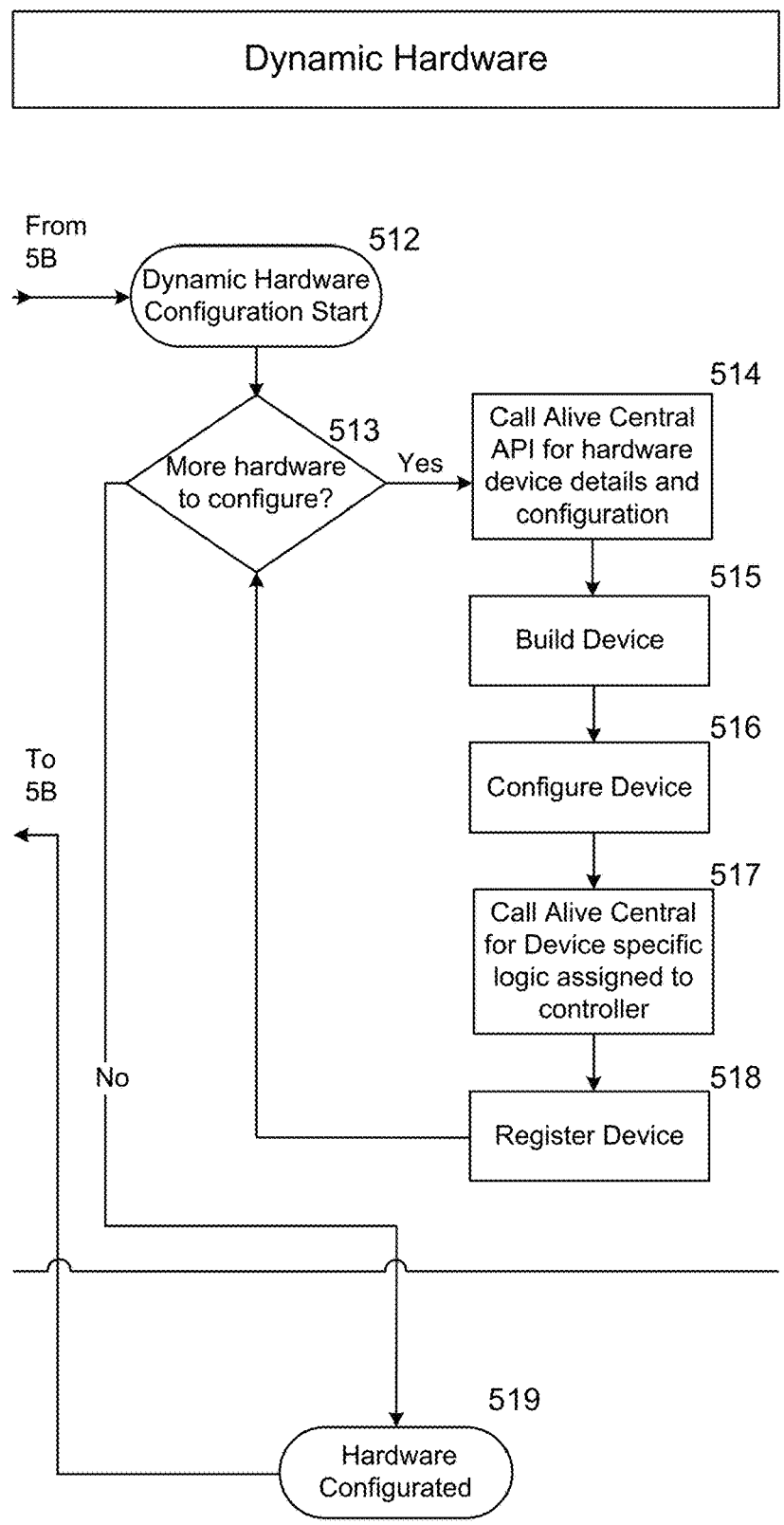
Figure 5D:
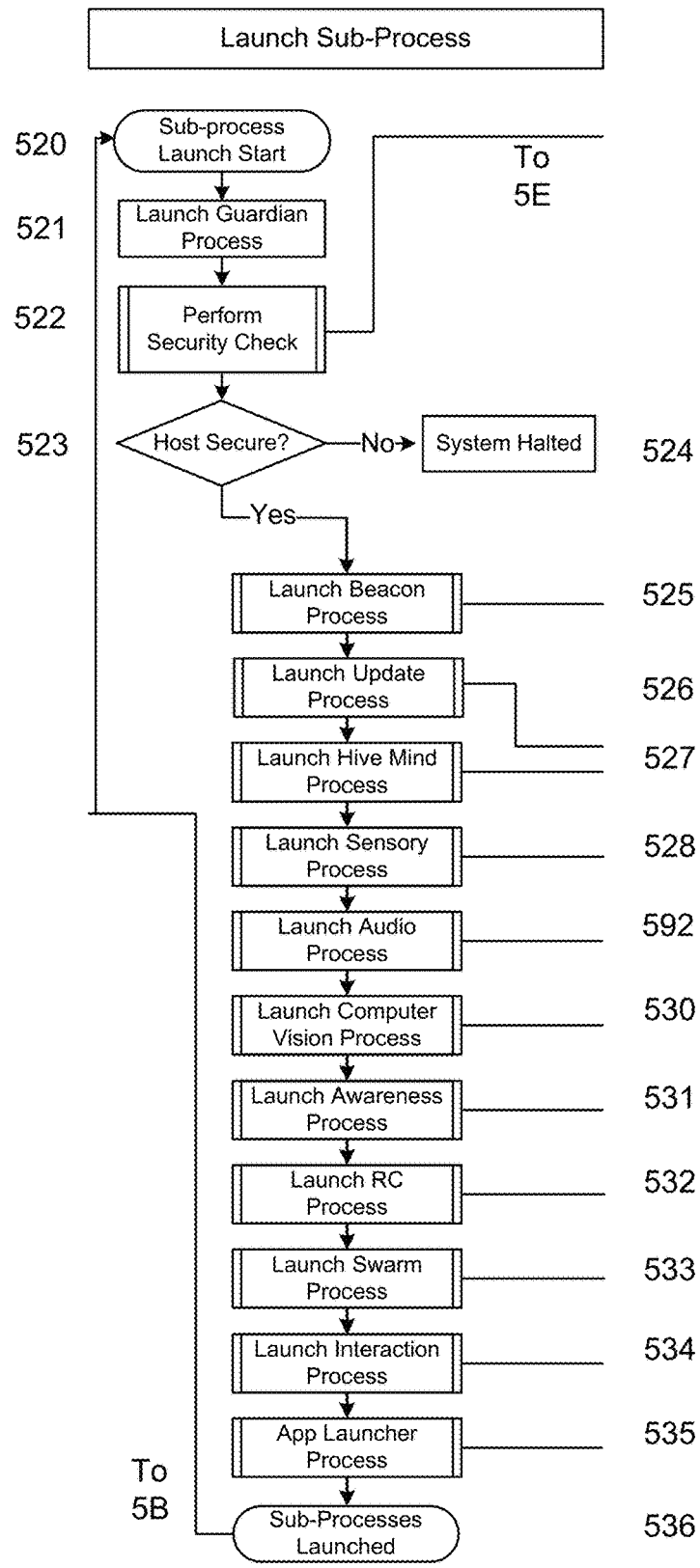
Figure 5E:
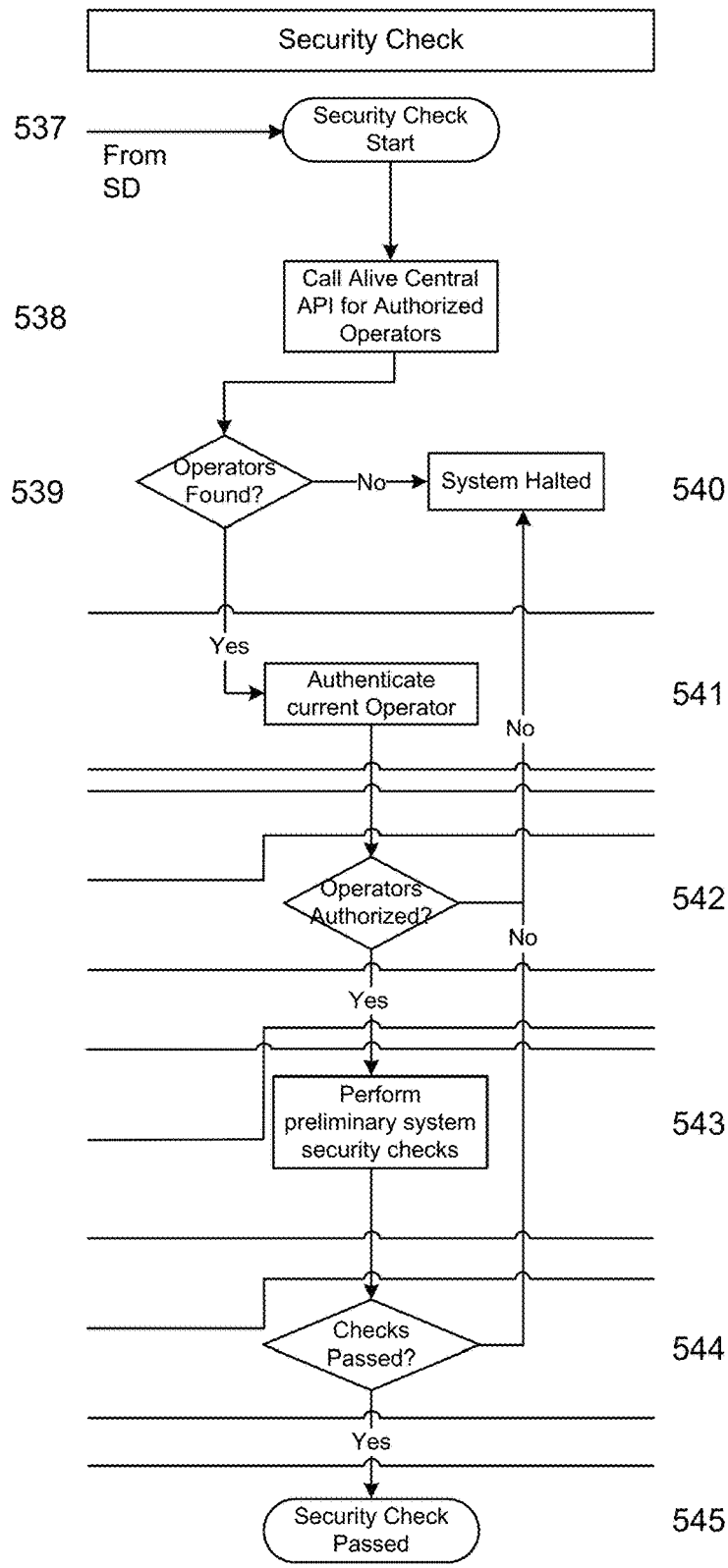
Figure 5F:
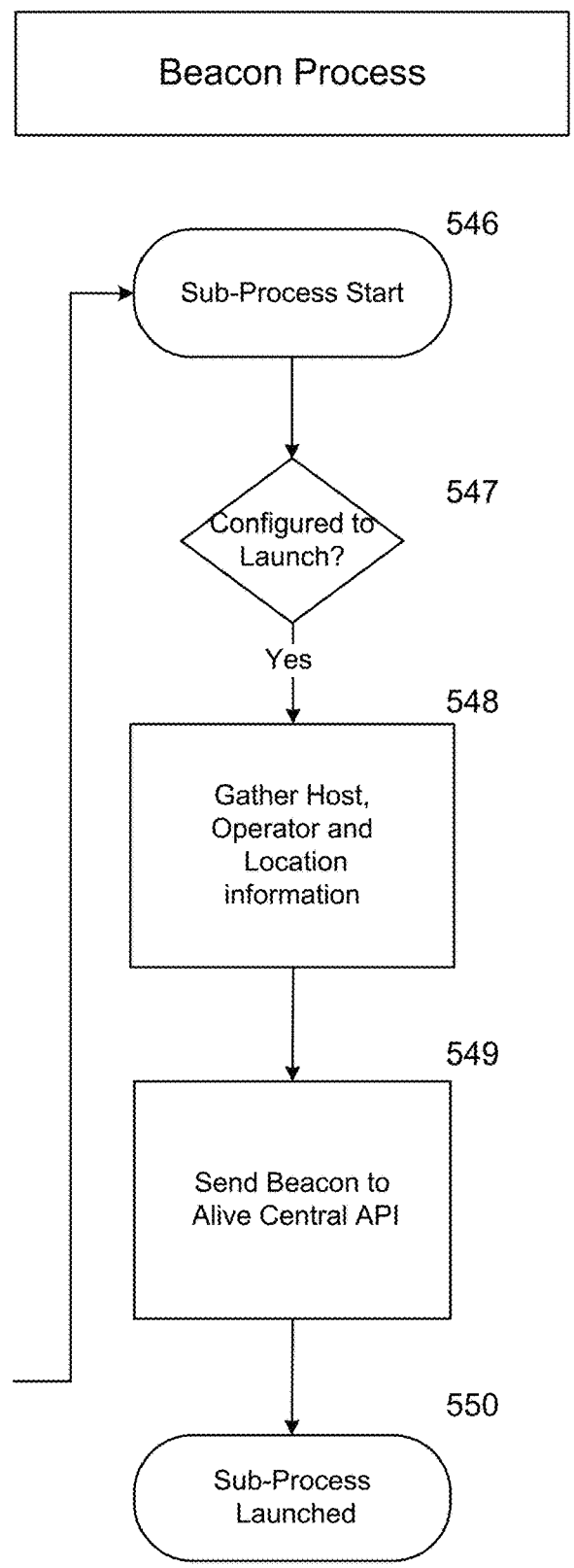
Figure 5G:
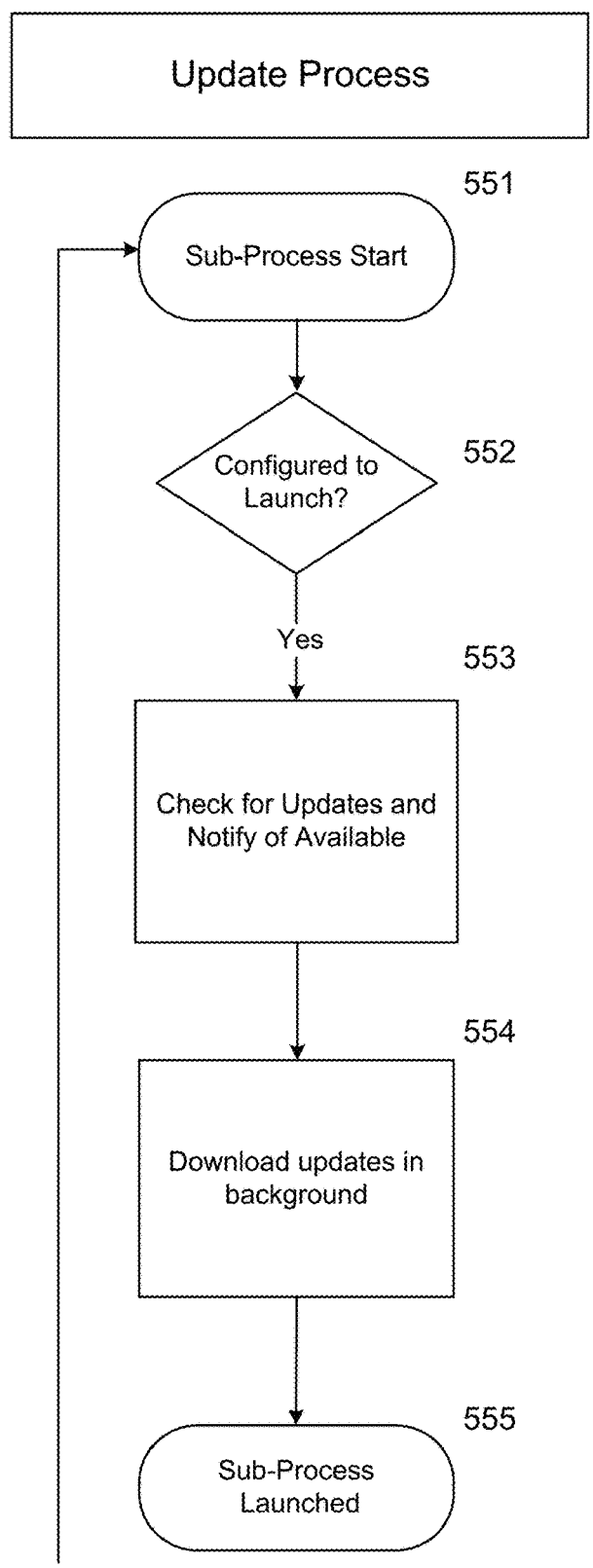
Figure 5H:
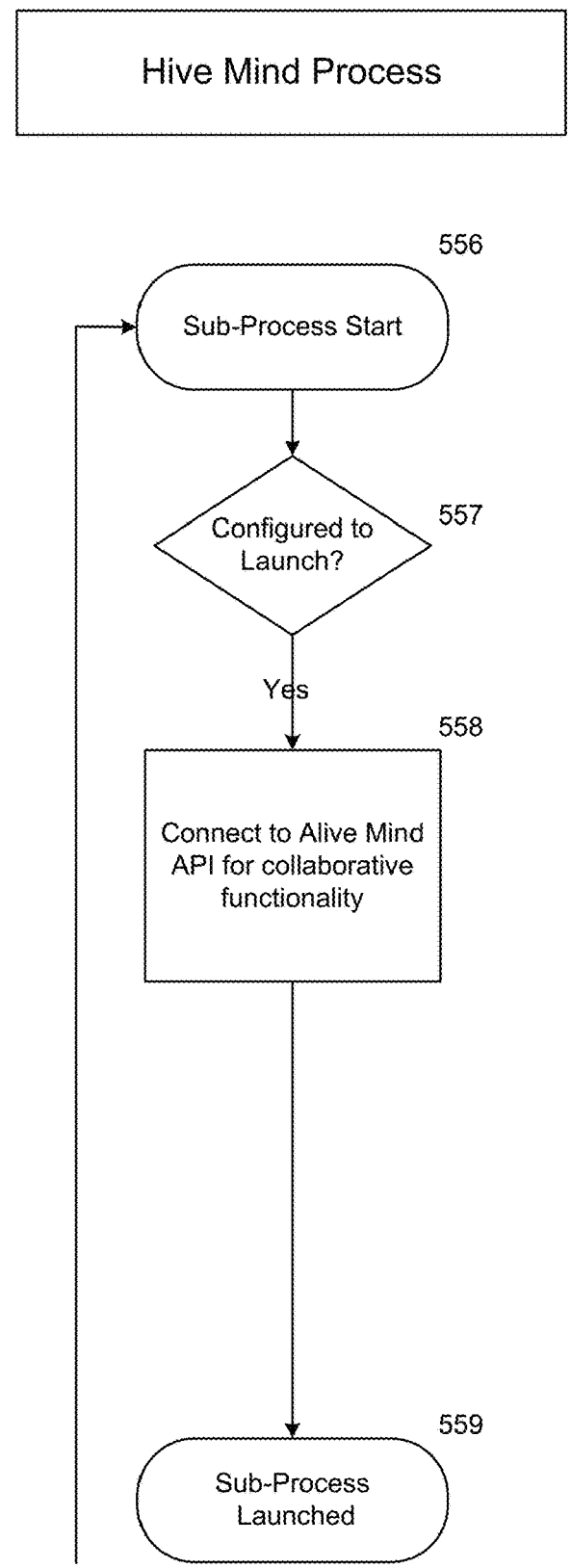
Figure 5I:
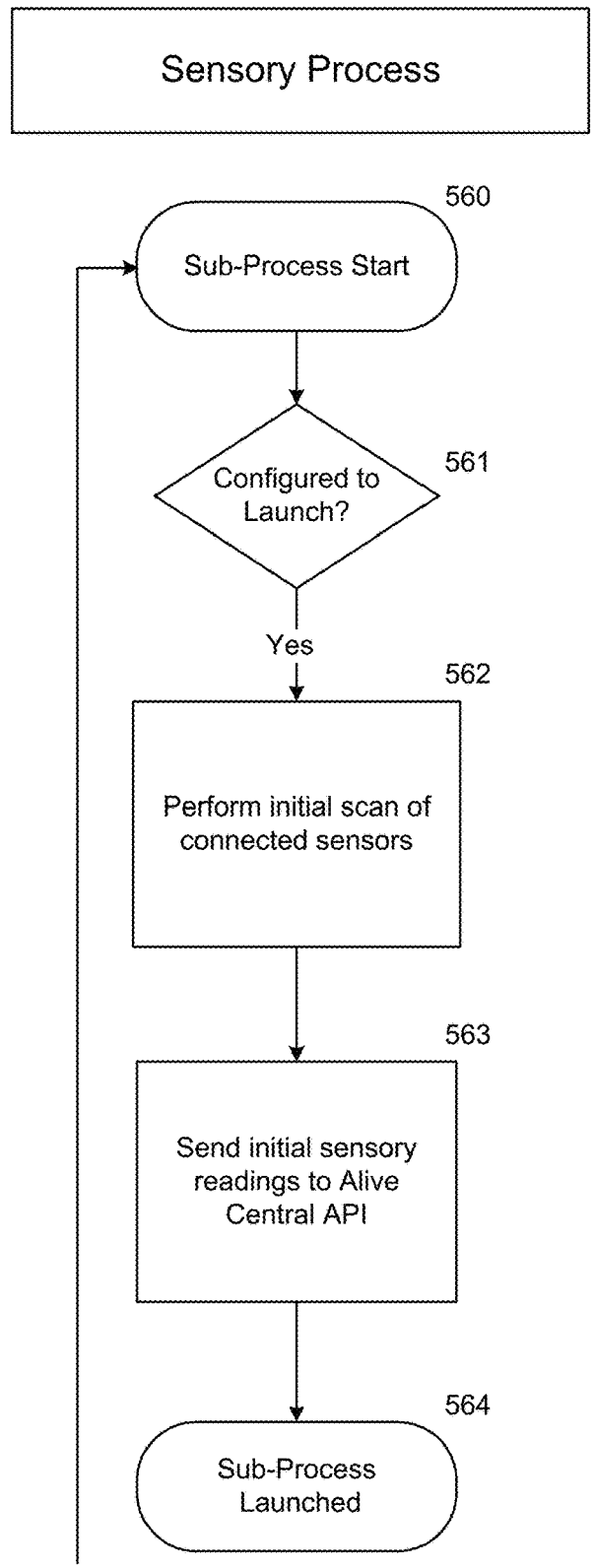
Figure 5J:
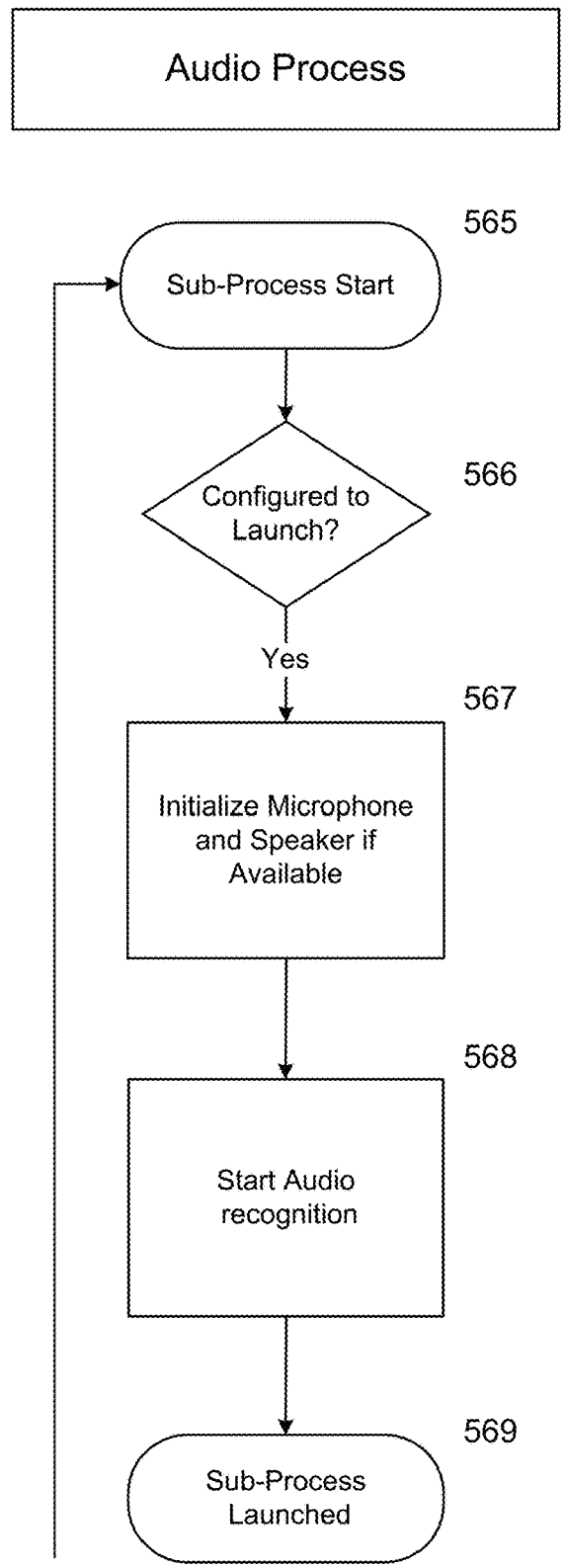
Figure 5K:
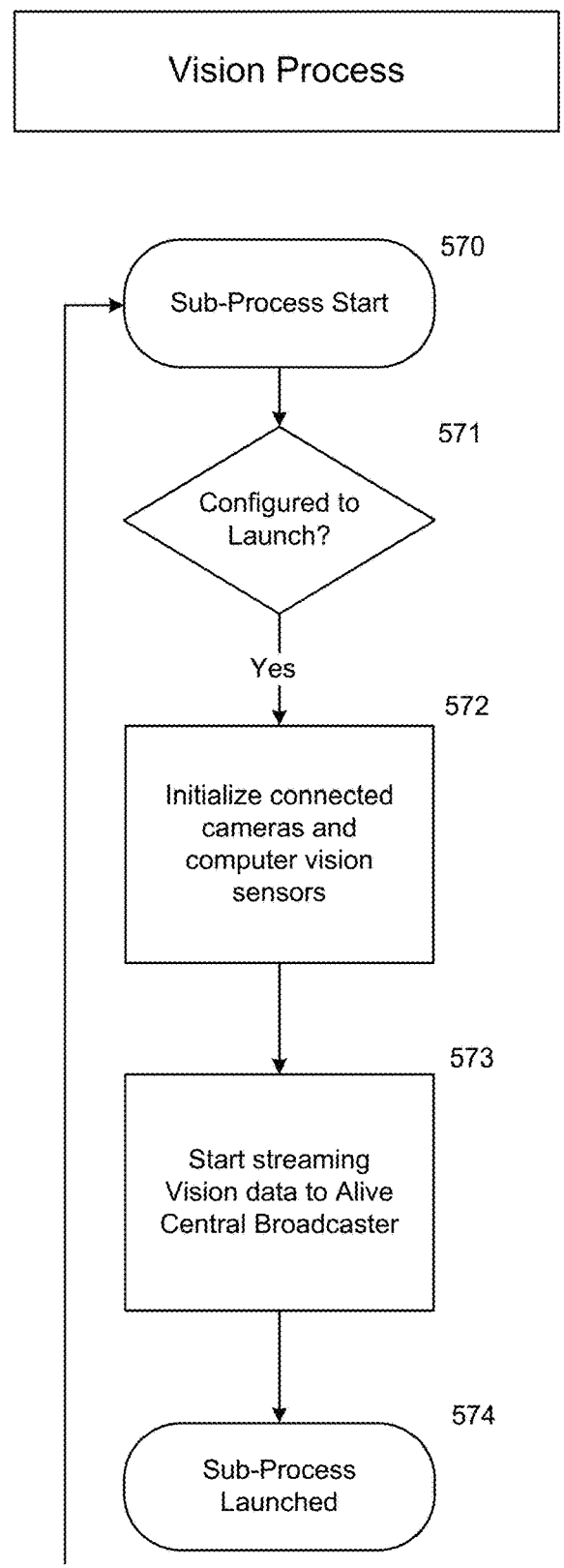
Figure 5L:
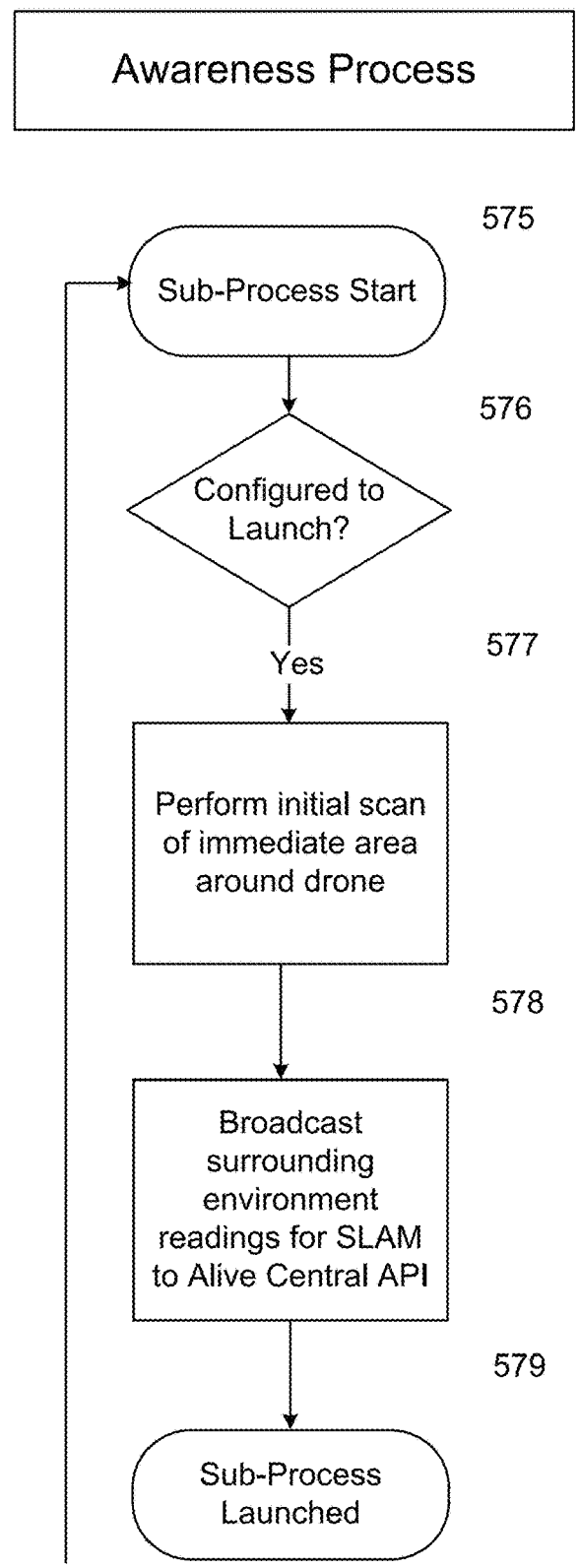
Figure 5M:
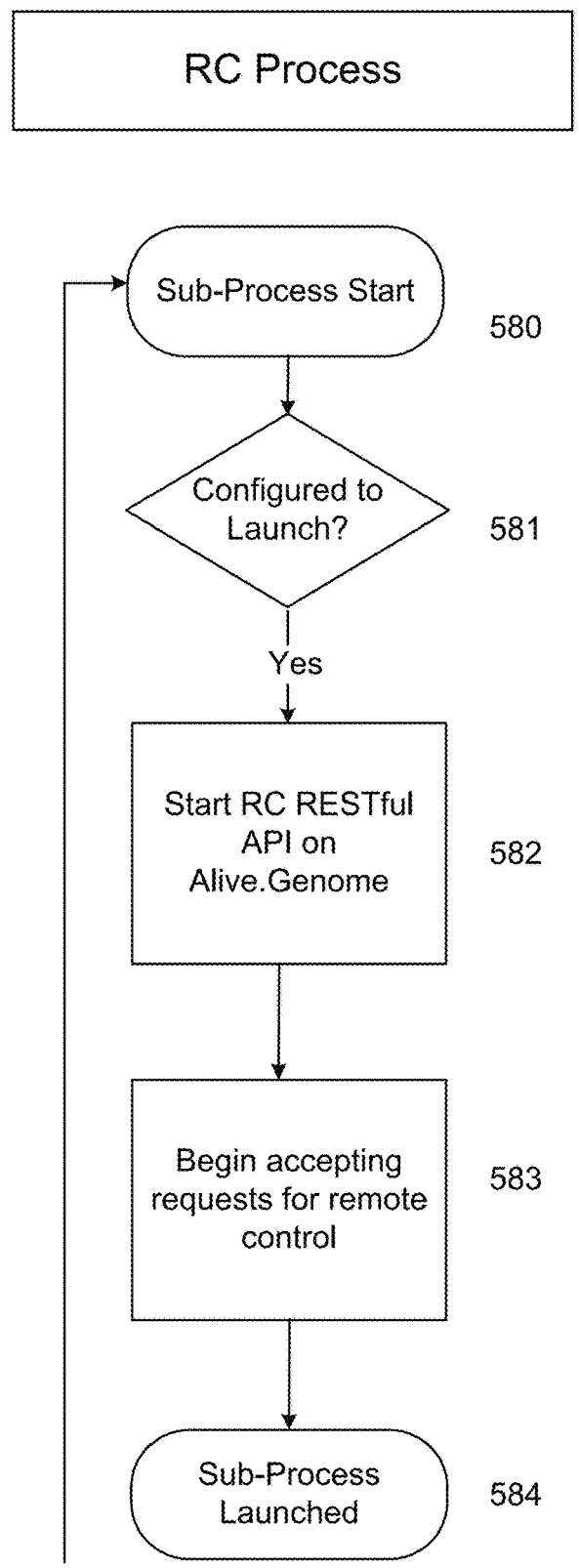
Figure 5N:
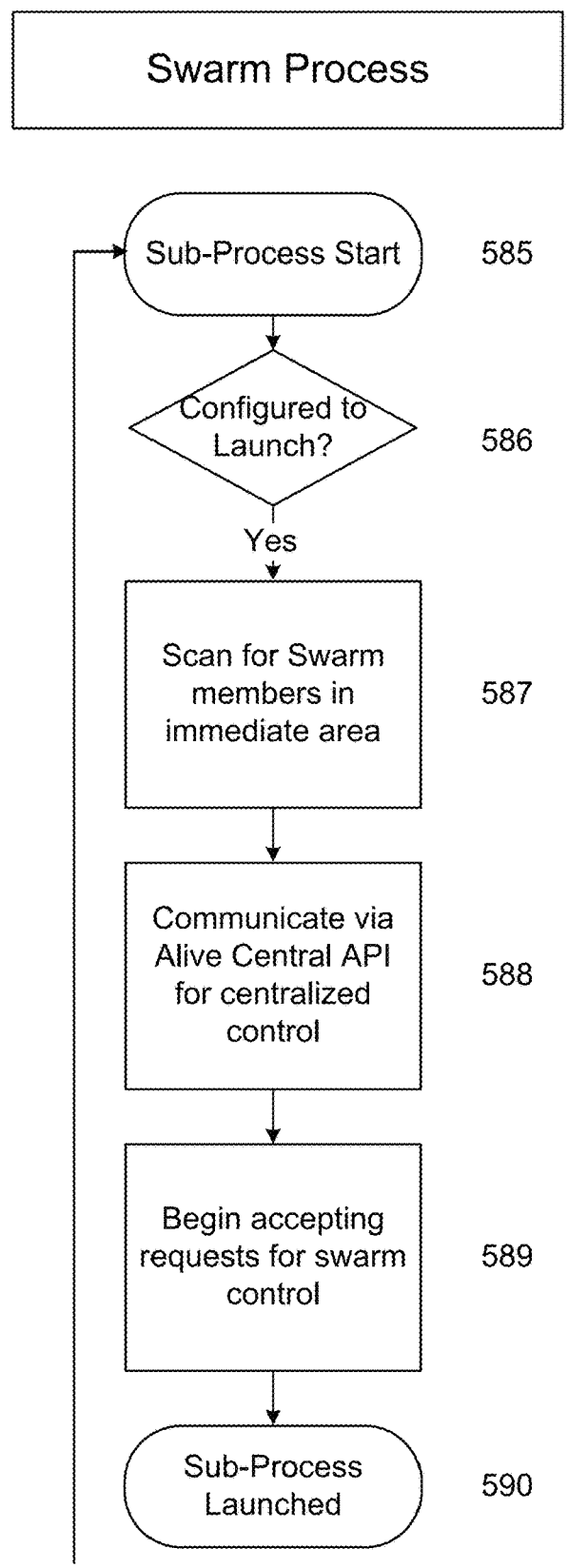
Figure 5O:
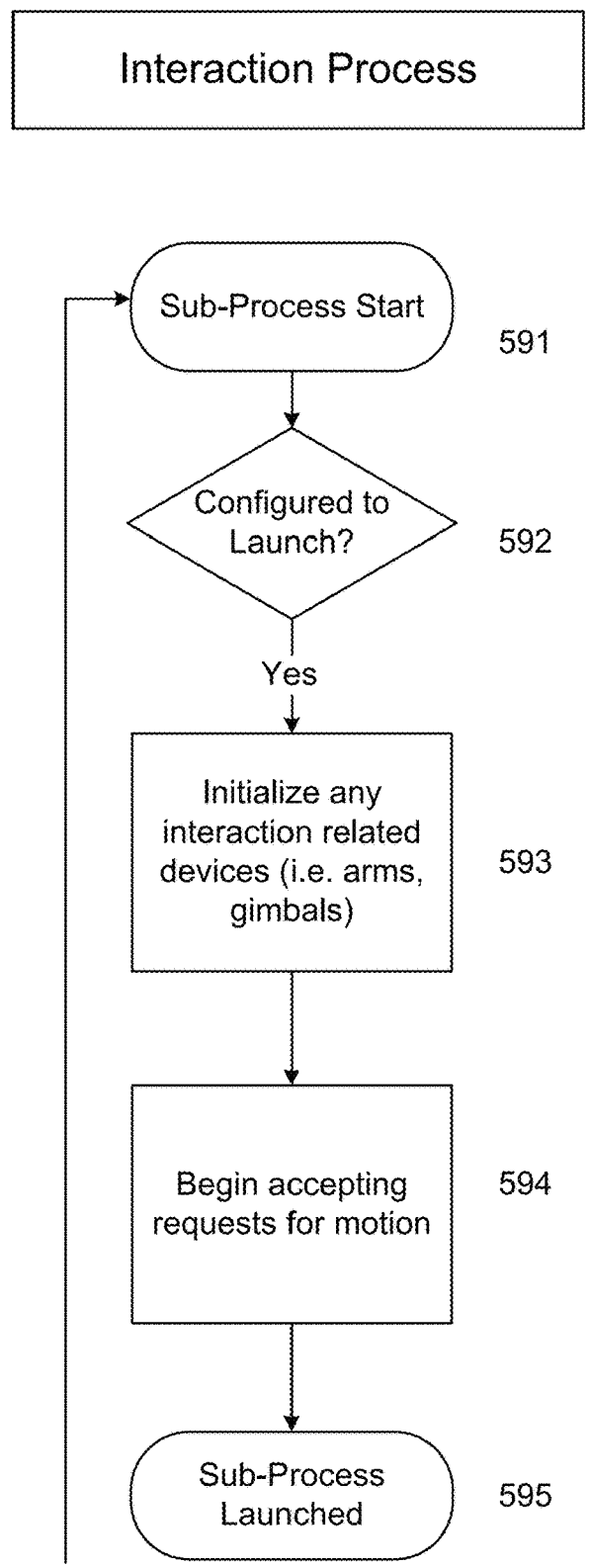
Figure 5P:
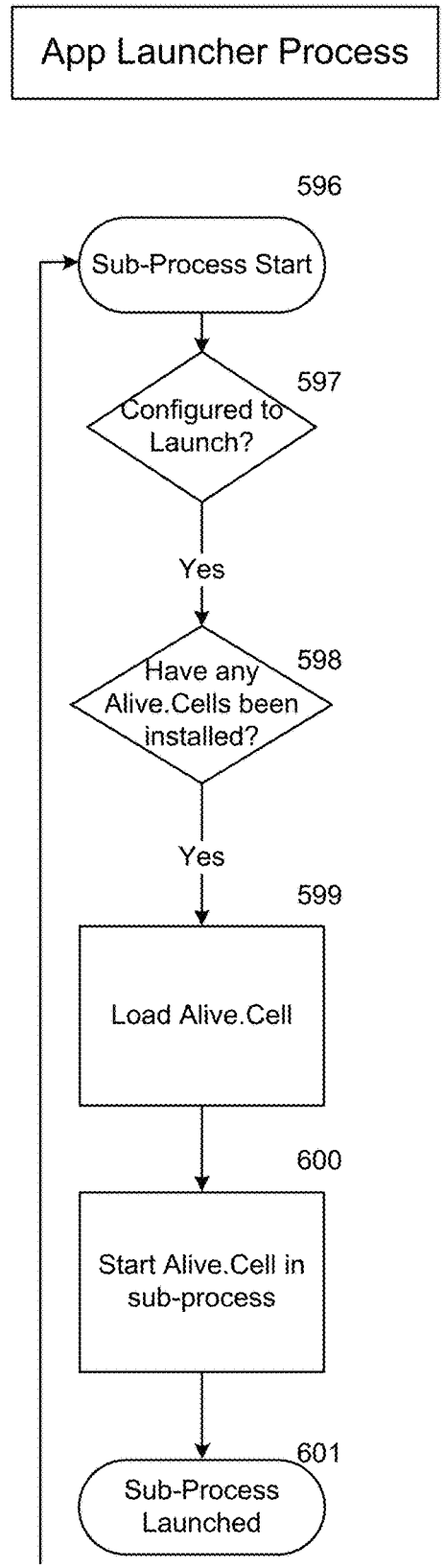

The following are example processes that may be performed by the systems of FIGS. 1A-4B to implement and/or provide the features described above. FIGS. 5A-5P illustrate an Alive Genome boot process for initializing and launching the various system components. Unless otherwise noted, the process may be performed by a processor of the device.

In 500, the boot process may begin within an alive genome equipped device (e.g., a drone or robot). Boot process may begin on device power-up, for example. In 501, an underlying OS boot up sequence may be processed. In 502, device may launch alive runtime and sub-processes, as described below. In 503, an alive admin web portal may be started to allow users to interact with the drone or robot. In 504, alive genome may be booted and ready for orders.

An alive runtime boot process may proceed as follows. In 505, the runtime boot process may begin. In 506, device may determine whether a runtime configuration is valid. If not, an error may be generated and/or booting may be prevented. If the configuration is valid, in 507, device may load the configuration. In 508, device may dynamically configure hardware based on the configuration, as described below. In 509, device may determine whether configuration is successful. If not, an error may be generated and/or booting may be prevented. If configuration is successful, in 510, device may launch sub-processes, as described below. Once sub-processes are launched, in 511, alive runtime may be active on device and ready to control device.

Dynamic hardware configuration may proceed as follows. In 512, dynamic hardware configuration may begin. In 513, device may determine whether there is hardware to configure. If so, for each hardware element to configure, processing 514-518 may take place. In 514, device may call alive central API for hardware element details and configuration (e.g., generally applicable hardware data). In 515, device may build the hardware element configuration. In 516, device may configure the element. In 517, device may call alive central for element specific logic (e.g., specific configuration data for the element and/or device). In 518, device may register the hardware element. When there is no more hardware to configure, in 519, device may finish dynamic hardware configuration.

Sub-process launch may proceed as follows. In 520, sub-process launch may begin. In 521, device may launch a guardian process. In 522, device may perform a security check, as described in greater detail below. In 523, device may determine whether or not it is secure based on the security check. If not, in 524, an error may be generated and/or booting may be prevented. If device is secure, sub-process launch may begin. For example, in 525, device may launch a beacon process. In 526, device may launch an update process. In 527, device may launch a hive mind process. In 528, device may launch a sensory process. In 529, device may launch an audio process. In 530, device may launch a computer vision process. In 531, device may launch an awareness process. In 532, device may launch a remote control process. In 533, device may launch a swarm process. In 534, device may launch an interaction process. In 535, device may launch an app launcher process. Each of these launch processes is described in greater detail below. When all sub-processes are launched, in 536, sub-process launching may end.

The security check may proceed as follows. In 537, security check processing may start. In 538, device may call alive central API for authorized operators. In 539, device may receive an answer as to whether there are any authorized operators available for the device. If there is no authorized operator, in 540, an error may be generated and/or booting may be prevented. If an authorized operator is found, in 541, device may authenticate the current operator (e.g., a user logged into and operating the device). In 542, device may determine whether the current operator is authorized based on the authentication attempt (e.g., whether the user's credentials passed or failed). If not, in 540, an error may be generated and/or booting may be prevented. If the user is authorized, in 543, device may perform preliminary system security checks. In 544, device may determine whether the security checks passed. If not, in 540, an error may be generated and/or booting may be prevented. If so, in 545, device may determine that the security checks have passed.

Beacon launch process may proceed as follows. In 546, beacon sub-process may begin. In 547, device may determine whether it is configured to launch beacon process. If not, an error may be generated and/or beacon process may end. If so, in 548, device may gather host, operator, and location information to which to send a beacon (e.g., alive central host, operator, and location). In 549, device may send a beacon to alive central API. In 550, beacon launch process may be completed.

Update launch process may proceed as follows. In 551, update sub-process may begin. In 552, device may determine whether it is configured to launch update process. If not, an error may be generated and/or update process may end. If so, in 553, device may check for updates and, in some embodiments, notify a user if updates are available. In 554, device may download updates in the background. A user may authorize installation of the downloaded updates in some embodiments. In other embodiments, device may install the updates automatically. In 555, update launch process may be completed.

Hive mind launch process may proceed as follows. In 556, hive mind sub-process may begin. In 557, device may determine whether it is configured to launch hive mind process. If not, an error may be generated and/or hive mind process may end. If so, in 558, device may connect to alive mind API to enable collaborative functionality with other devices and/or servers. In 559, hive mind launch process may be completed.

Sensory launch process may proceed as follows. In 560, sensory sub-process may begin. In 561, device may determine whether it is configured to launch sensory process. If not, an error may be generated and/or sensory process may end. If so, in 562, device may perform an initial scan of connected sensors. In 563, device may send initial sensory readings to alive central API. In 564, sensory launch process may be completed, and sensors may be available to sense data from the environment.

Audio launch process may proceed as follows. In 565, audio sub-process may begin. In 566, device may determine whether it is configured to launch audio process. If not, an error may be generated and/or update process may end. If so, in 567, device may initialize its microphone(s) and/or speaker(s). In 568, device may start audio recognition to detect audio (e.g., commands, signals of interest, etc.) in the environment. In 569, audio launch process may be completed.

Vision launch process may proceed as follows. In 570, vision sub-process may begin. In 571, device may determine whether it is configured to launch vision process. If not, an error may be generated and/or vision process may end. If so, in 572, device may initialize its camera(s) and/or other vision sensor(s). In 573, device may start streaming vision data captured by camera/vision sensor to alive central broadcaster. In 574, vision launch process may be completed.

Awareness launch process may proceed as follows. In 575, awareness sub-process may begin. In 576, device may determine whether it is configured to launch awareness process. If not, an error may be generated and/or awareness process may end. If so, in 577, device may perform an initial scan of the immediate area around the device. For example, device may use audio/video sensors initialized as described above to perform the scanning. In 578, device may broadcast detected environment readings for SLAM to alive central API. In 579, awareness launch process may be completed.

Remote control launch process may proceed as follows. In 580, remote control sub-process may begin. In 581, device may determine whether it is configured to launch remote control process. If not, an error may be generated and/or remote control process may end. If so, in 582, device may start remote control RESTful API on alive genome. In 583, device may begin accepting remote control requests. In 584, remote control launch process may be completed.

Swarm launch process may proceed as follows. In 585, swarm sub-process may begin. In 586, device may determine whether it is configured to launch swarm process. If not, an error may be generated and/or swarm process may end. If so, in 587, device may scan for other swarm-ready devices in the area (e.g., by detecting transmissions from these other devices indicating they are available for swarm communication). In 588, device may communicate using alive central API to request centralized control. In 589, device may begin accepting requests for swarm central control, behaving in concert with the nearby swarm-ready devices when requests are received. In 590, swarm launch process may be completed.

Interaction launch process may proceed as follows. In 591, interaction sub-process may begin. In 592, device may determine whether it is configured to launch interaction process. If not, an error may be generated and/or interaction process may end. If so, in 593, device may initialize any interaction-related components (e.g., arms, gimbals, etc.). In 594, device may begin accepting requests for motion (e.g., commands from remote user devices). In 595, interaction launch process may be completed.

App launcher launch process may proceed as follows. In 596, app launcher sub-process may begin. In 597, device may determine whether it is configured to launch app launcher process. If not, an error may be generated and/or app launcher process may end. If so, in 598, device may determine whether any alive cells have been installed. If not, an error may be generated and/or app launcher process may end. If so, in 599, device may load one or more installed alive cells. In 600, device may start operation of the loaded alive cell(s). In 601, app launcher launch process may be completed.

Figure 6A:
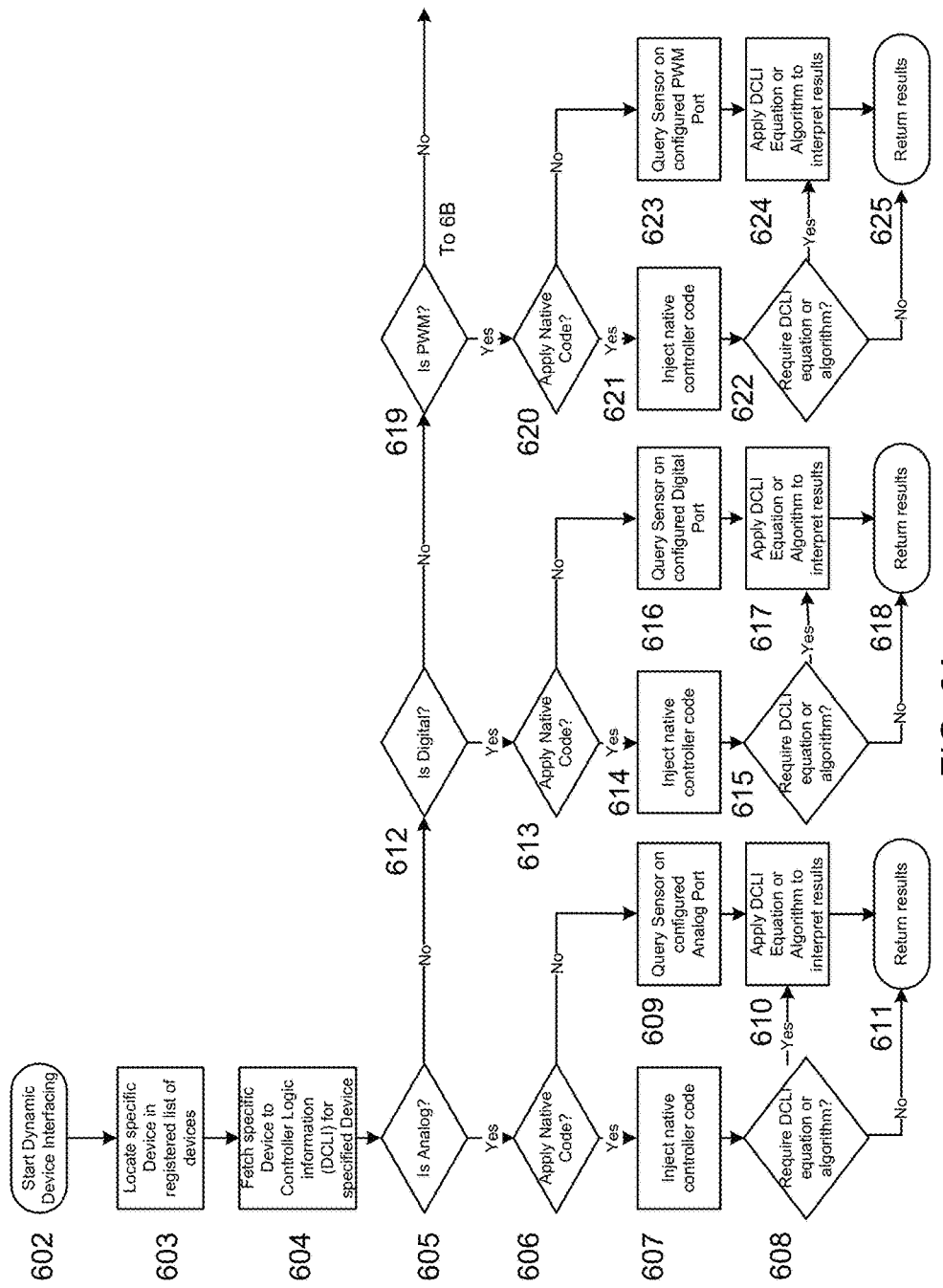
FIGS. 6A-6C illustrate a dynamic query process according to an embodiment of the invention.
Figure 6B:
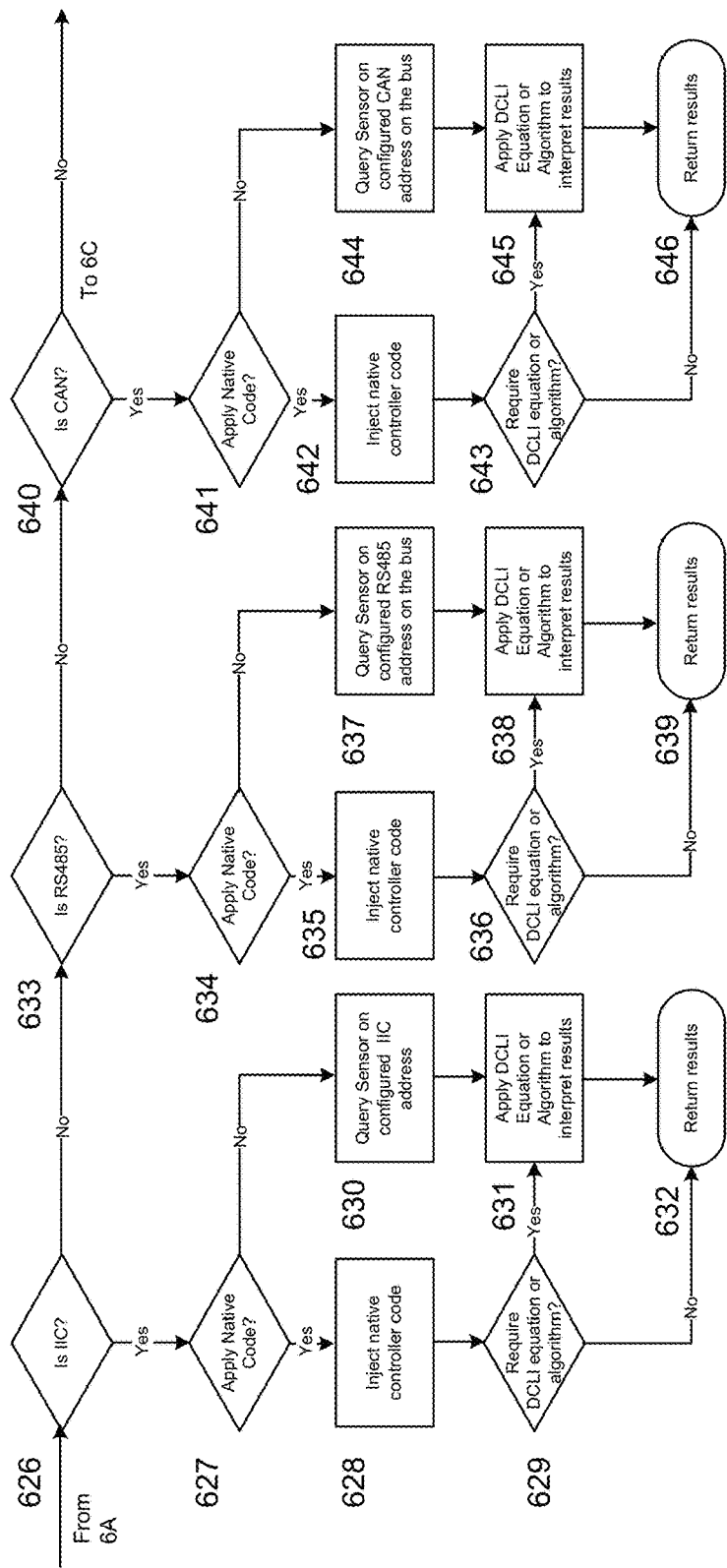
Figure 6C:
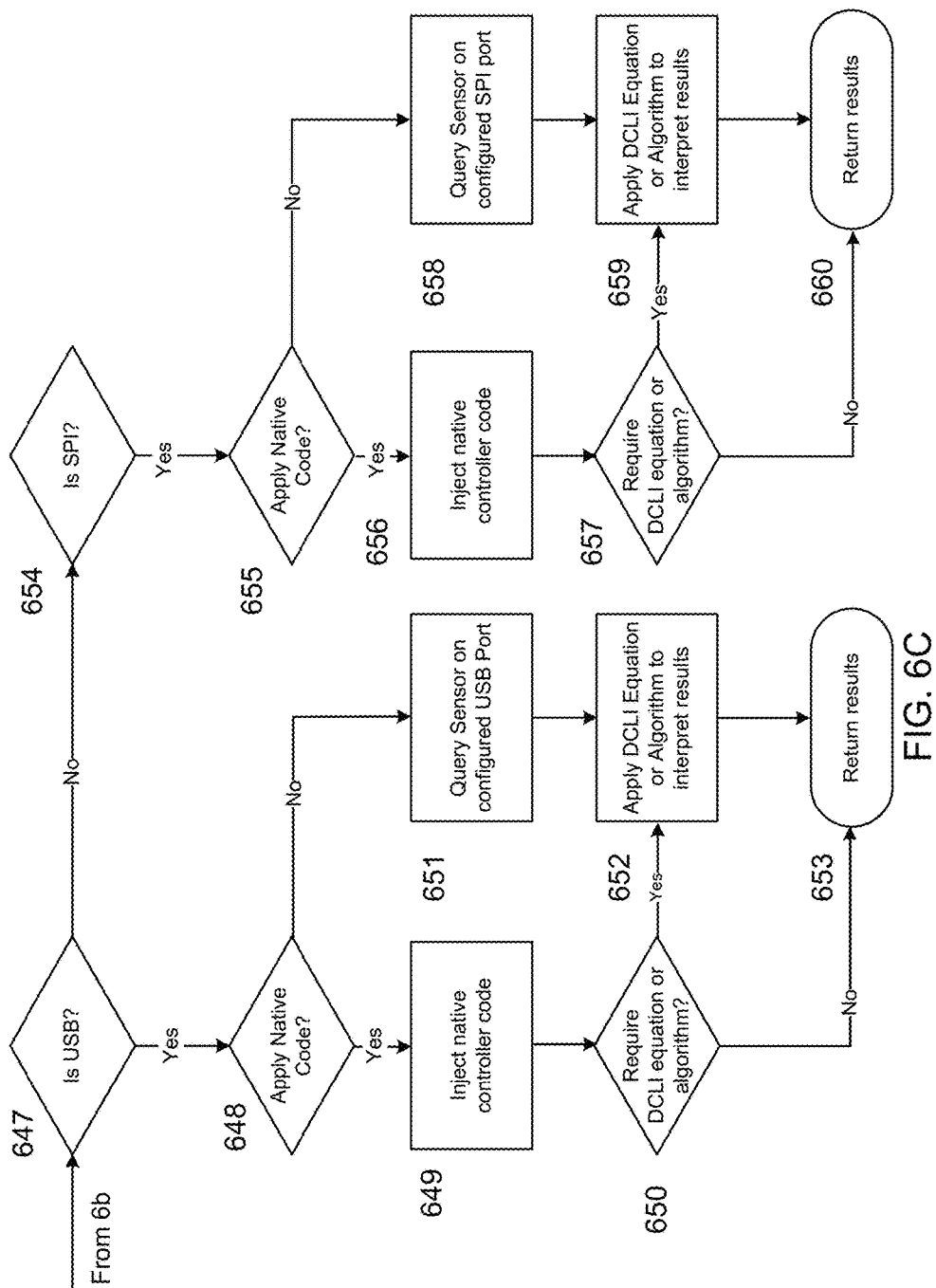

As noted above, the system can seamlessly interact with any kind of drone hardware. FIGS. 6A-6C illustrate a dynamic query process whereby the system queries a device to be controlled, injects controller code, and receives and interprets results obtained by the device. This may enable the system to integrate drone-based components so they may be controlled and may communicate with the Alive backend components. Unless otherwise noted, the process may be performed by a processor of one or more cloud servers and/or local devices configured to interact with a drone or robot, as described above.

In 602, processor may start dynamic device interfacing. In 603, processor may locate a specific device in a registered list of devices (e.g., responsive to a user selection of the specific device). In 604, processor may fetch specific device to logic controller information for the located specific device.

The dynamic query process may proceed differently depending on characteristics of the device. For example, in 605, if the device is analog, processor may determine whether native code is to be applied in 606. If so, in 607, processor may inject native controller code. In 608, processor may determine whether a distributed command line interface (DCLI) equation or algorithm is required. If not, in 611, processor may return results. If so, in 610, processor may apply DCLI equation or algorithm to interpret results before returning the results in 611. If native code is not to be applied, in 609, processor may query sensor on configured analog port. In 610, processor may apply DCLI equation or algorithm to interpret results before returning the results in 611.

In 612, if the device is digital, processor may determine whether native code is to be applied in 613. If so, in 614, processor may inject native controller code. In 615, processor may determine whether a DCLI equation or algorithm is required. If not, in 618, processor may return results. If so, in 617, processor may apply DCLI equation or algorithm to interpret results before returning the results in 618. If native code is not to be applied, in 616, processor may query sensor on configured digital port. In 617, processor may apply DCLI equation or algorithm to interpret results before returning the results in 618.

In 619, if the device uses pulse width modulation (PWM), processor may determine whether native code is to be applied in 620. If so, in 621, processor may inject native controller code. In 622, processor may determine whether a DCLI equation or algorithm is required. If not, in 625, processor may return results. If so, in 624, processor may apply DCLI equation or algorithm to interpret results before returning the results in 625. If native code is not to be applied, in 623, processor may query sensor on configured PWM port. In 624, processor may apply DCLI equation or algorithm to interpret results before returning the results in 625.

In 626, if the device uses inter-integrated control (IIC), processor may determine whether native code is to be applied in 627. If so, in 628, processor may inject native controller code. In 629, processor may determine whether a DCLI equation or algorithm is required. If not, in 632, processor may return results. If so, in 631, processor may apply DCLI equation or algorithm to interpret results before returning the results in 632. If native code is not to be applied, in 630, processor may query sensor on configured IIC address. In 631, processor may apply DCLI equation or algorithm to interpret results before returning the results in 632.

In 633, if the device uses RS485, processor may determine whether native code is to be applied in 634. If so, in 635, processor may inject native controller code. In 636, processor may determine whether a DCLI equation or algorithm is required. If not, in 639, processor may return results. If so, in 638, processor may apply DCLI equation or algorithm to interpret results before returning the results in 639. If native code is not to be applied, in 637, processor may query sensor on configured RS485 address on the bus. In 638, processor may apply DCLI equation or algorithm to interpret results before returning the results in 639.

In 640, if the device uses controller area network (CAN), processor may determine whether native code is to be applied in 641. If so, in 642, processor may inject native controller code. In 643, processor may determine whether a DCLI equation or algorithm is required. If not, in 646, processor may return results. If so, in 645, processor may apply DCLI equation or algorithm to interpret results before returning the results in 646. If native code is not to be applied, in 644, processor may query sensor on configured CAN address on the bus. In 645, processor may apply DCLI equation or algorithm to interpret results before returning the results in 646.

In 647, if the device uses universal serial bus (USB), processor may determine whether native code is to be applied in 648. If so, in 649, processor may inject native controller code. In 650, processor may determine whether a DCLI equation or algorithm is required. If not, in 653, processor may return results. If so, in 652, processor may apply DCLI equation or algorithm to interpret results before returning the results in 653. If native code is not to be applied, in 651, processor may query sensor on configured USB port. In 652, processor may apply DCLI equation or algorithm to interpret results before returning the results in 653.

In 654, if the device uses serial peripheral interface (SPI), processor may determine whether native code is to be applied in 655. If so, in 656, processor may inject native controller code. In 657, processor may determine whether a DCLI equation or algorithm is required. If not, in 660, processor may return results. If so, in 659, processor may apply DCLI equation or algorithm to interpret results before returning the results in 660. If native code is not to be applied, in 658, processor may query sensor on configured SPI port. In 659, processor may apply DCLI equation or algorithm to interpret results before returning the results in 660.

Figure 7A:
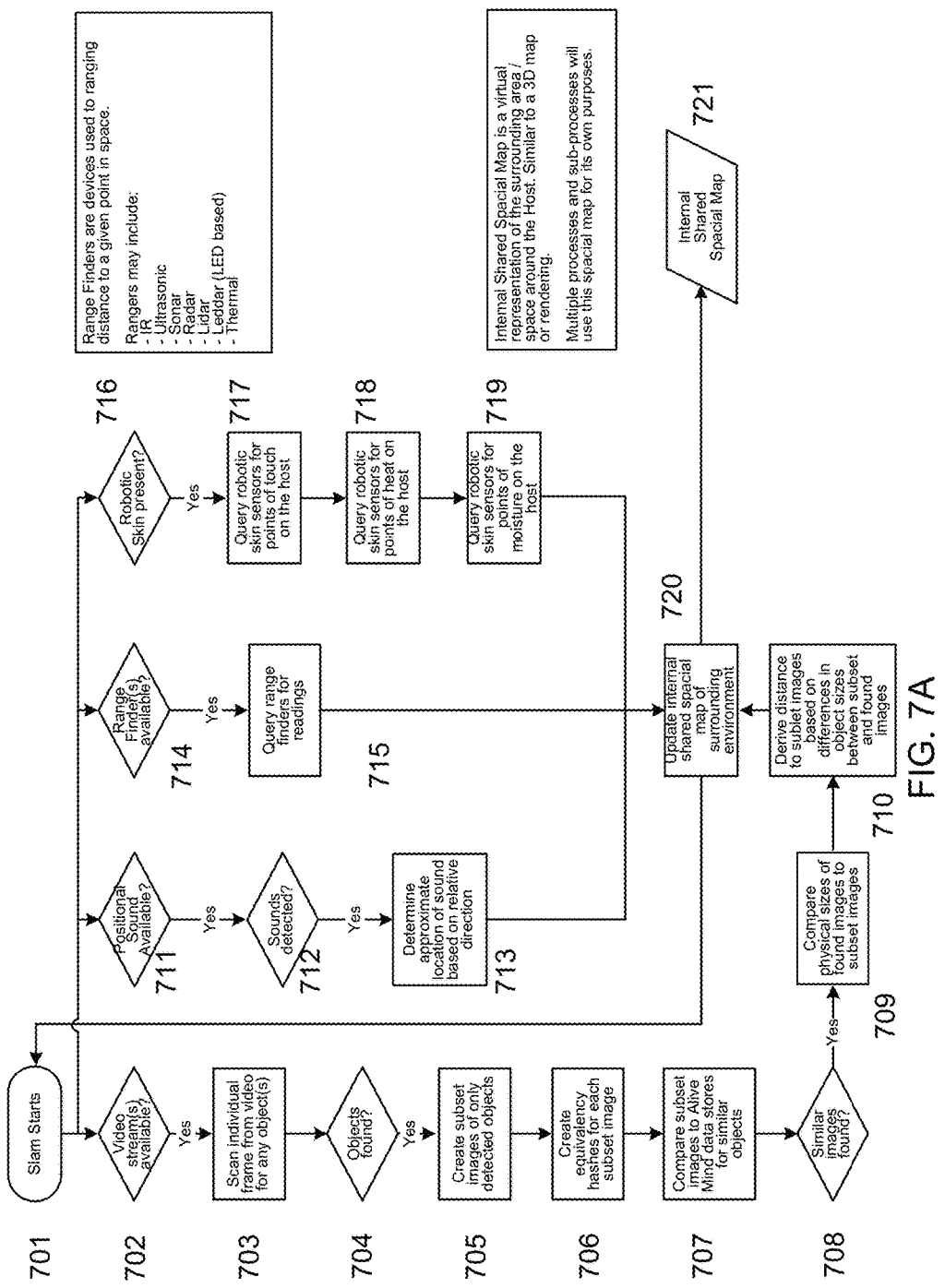
FIG. 7A illustrates a process of simultaneous location and area mapping for a drone or robot according to an embodiment of the invention.
Figure 7B:
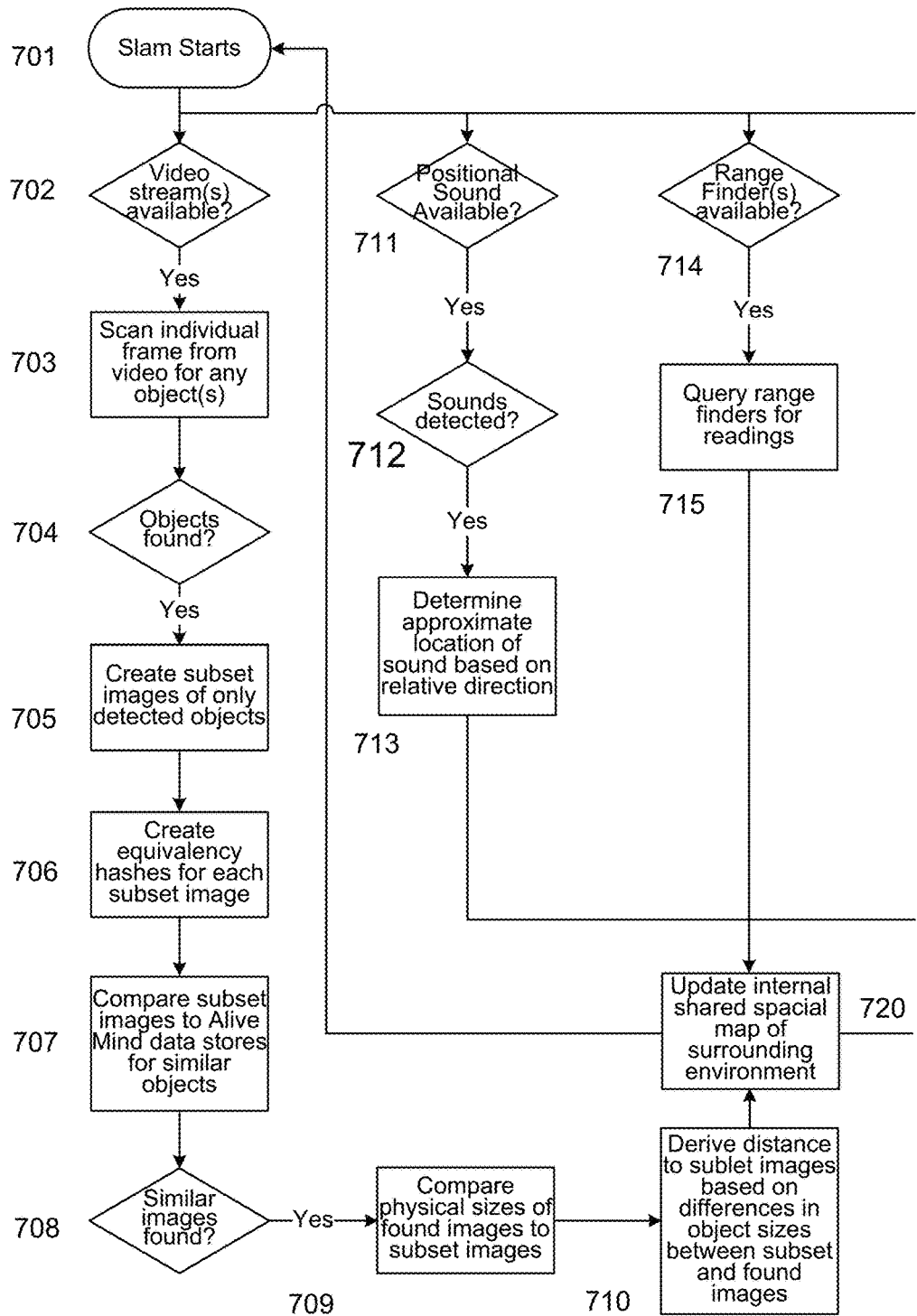

FIGS. 7A-7C illustrate two separate embodiments of SLAM processing for a drone or robot according to an embodiment of the invention, wherein 7A shows one embodiment, and 7B-7C together show another embodiment. This processing may allow the drone or robot to sense its surroundings via a variety of inputs and build a spatial map of what surrounds the drone or robot. The drone or robot may use the spatial map to locate items in the environment, avoid obstacles, navigate the environment, and/or determine a context of an environment (e.g., see item, hear item, classify item based on combined inputs). The sensors used for data collection as described elsewhere herein may also be used for spatial surrounding sensing by the drone. Furthermore, additional sensors (e.g., olfactory) may also be used, although they are not specifically shown in FIGS. 7A-7C. Unless otherwise noted, the processes may be performed by a processor of a drone or robot, as described above.

In the process of FIG. 7A, SLAM processing may begin in 701. The drone or robot may determine position based on visual data. In 702, processor may determine whether video streams are available. If so, in 703, processor may scan an individual frame of the video for objects. In 704, if objects are found, video processing may proceed. In 705, processor may create subset images including only the detected objects (e.g., removing other elements of the images aside from the detected objects). In 706, processor may create equivalency hashes for each subset image. The equivalency hashes may be compared to stored hashes to determine whether the detected object matches a known object. For example, in 707, processor may compare the subset image hashes to hashes in alive mind data stores to find similar objects. If, in 708, similar images are found, in 709, processor may compare the physical sizes of found images to subset images created earlier in the process. In 710, processor may derive a distance to a subset image based on a difference between object sizes (e.g., if the similar image indicates that the subset image is an object of a known size, the difference between the known object size and the actual imaged object size may be used to determine how far the drone or robot is from the actual imaged object. In 720, processor may update internal shared special map of the surrounding environment based on the derived distance.

The drone or robot may determine position based on audio data. In 711, processor may determine whether positional sounds are available. If so, in 712, processor may detect a sound. In 704, if objects are found, video processing may proceed. In 713, processor may determine an approximate location of the sound based on the relative direction from which the sound was detected. In 720, processor may update internal shared special map of the surrounding environment based on the sound.

The drone or robot may determine position based on range finder data. In 714, processor may determine whether range finder(s) are available. If so, in 715, processor may query the range finders for readings. In 720, processor may update internal shared special map of the surrounding environment based on the range finder readings.

The drone or robot may determine position based on data detected by robotic skin sensors. In 716, processor may determine whether robotic skin is present. If so, in 717, processor may query robotic skin sensors for physical contact with objects in the environment. In 718, processor may query robotic skin sensors for temperature readings. In 719, processor may query robotic skin sensors for moisture readings. In 720, processor may update internal shared special map of the surrounding environment based on the skin sensor readings.

In 721, processor may output the internal shared spatial map for use by other device processes.

The process of FIGS. 7B and 7C may be similar to that of FIG. 7A, except that additional sensors may also be used. In 722, processor may determine whether any additional sensors are present. If so, in 723, processor may query the additional sensor or sensors. In 720, processor may update internal shared special map of the surrounding environment based on the additional sensor readings. In 721, processor may output the internal shared spatial map for use by other device processes.

Figure 8A:
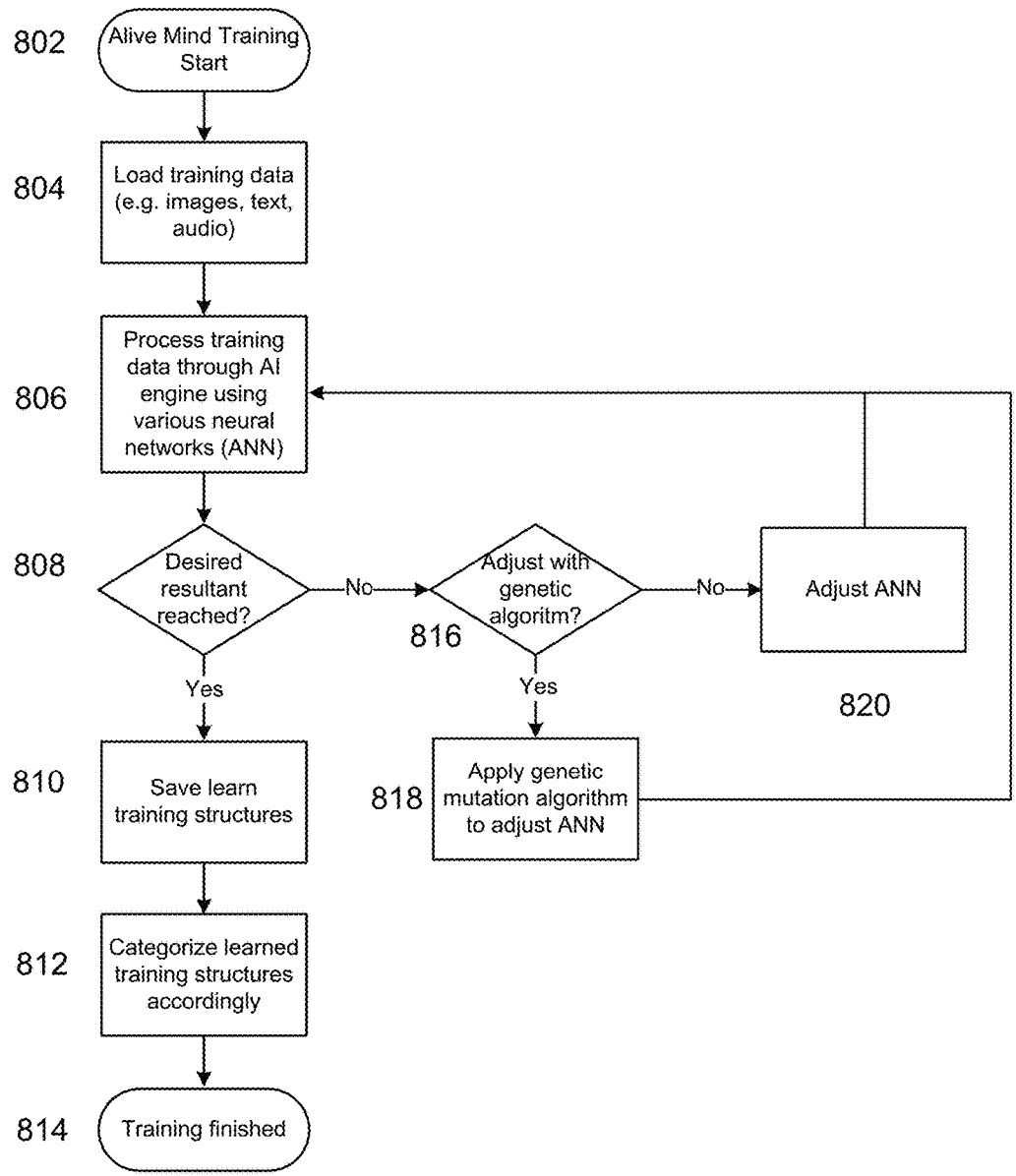
FIG. 8A illustrates a machine learning training process according to an embodiment of the invention.

FIG. 8A illustrates a machine learning training process according to an embodiment of the invention. As described above, machine learning may be used to process data gathered by drones and robots in a variety of ways. While specific neural networks and algorithms may differ depending on application and received data, this process may be applicable to any of the robot functions discussed above. For example, in the context of farming, a training data set may include still or video images of known bad crops and known good crops. These good/bad images may be identified and used to train, and then future images collected by drones may be used to identify good and bad crops based on the training. Unless otherwise noted, the process may be performed by a processor of one or more cloud servers and/or local devices configured to interact with a drone or robot, as described above.

In 802, the training process may begin. In 804, processor may load training data. In 806, processor may process the training data using one or more neural networks. In 808, processor may check whether a desired result was achieved. If so, in 810, processor may save learned training structures that brought about the desired result. In 812, processor may categorize learned training structures that are saved. In 814, training may end.

If the neural network processing did not achieve a desired result, in 816, processor may determine whether to adjust the neural network(s) with a genetic algorithm. If a genetic algorithm is to be used, in 818, processor may apply the genetic algorithm to the neural networks. If not, in 820, processor may adjust the neural networks without using a genetic algorithm. After adjustment, in 806, processor may process the training data using the adjusted one or more neural networks until a desired result is reached as described above.

FIG. 8B illustrates a machine self-learning process according to an embodiment of the invention. The process may allow the system to continually expand autonomously based on the data consumed regardless of the type of data. Consumed data may come in varying forms and may include, but is not limited to, imagery, video, audible sounds, and spoken languages, for example. The self-learning functions may be based on the premise of a stimulus and reaction tuple. These constructs may be assigned a reinforcement which may indicate positive, negative, or neutral reinforcement. From this premise, the system may perform self-learning. This pattern may apply to spoken and written languages, audio, video, images, and/or sensory data, for example. Unless otherwise noted, the process may be performed by a processor of one or more cloud servers and/or local devices configured to interact with a drone or robot, as described above.

In 850, the self-learning process may begin. In 852, processor may receive stimulus data triggering the self-learning (e.g., image, video, sound, etc.). In 854, processor may determine an appropriate workflow for self-learning. Workflows may dictate the execution of self-learning steps (processes) and the order in which they occur. Example workflows may include standard, random, genetic, mutating, evolutionary, adaptive, and/or fractal. In some embodiments, processor may select a workflow based on a system configuration (e.g., system may be configured to use one of the plurality of available workflows, and in this case, processor may select the workflow for which the system is configured). In some embodiments, processor may use a dynamic approach to analyze the context (stimulus/reaction tuple) against a data store of workflows. The analysis may include pattern matching for previous contexts received and the related workflow executed against this type of context. If a related workflow is found, that workflow may be selected. If no known patterns are detected related to a specific workflow, then the processor may predict which workflow may be best suited to the context received based on the actual context data itself and any metadata related to it. In 856, processor may apply the selected workflow.

FIG. 8B illustrates several example workflows that the processor may select. The standard workflow may apply a standard, predetermined arrangement of processes (described below) to self-learning. Under this approach, processor may receive stimulus and determine a reaction by following the standard arrangement of processes in order.

The workflow may have access to all the available processes for workflows described below.

The random workflow may be similar to the standard workflow except that it randomizes the order in which the processes execute. The randomization may be facilitated by the random number generator described above and/or off the shelf random number generators. Processor may choose one or more of the processes as part of its workflow. The outcome of the resultant process workflow may be unknown prior to processing. The workflow may have access to all the available processes for workflows described below.

The genetic workflow may leverage one or more genetic algorithms in order to determine which processes to execute. The processor may apply the genetic algorithms, which may choose one or more of the processes for the self-learning workflow. The outcome of the resultant process workflow may be unknown prior to processing. The workflow may have access to all the available processes for workflows described below.

The mutating workflow may leverage one or more mutational algorithms in order to determine which processes to execute. In a mutating workflow, the method of selecting the processes to execute may be unique each and every time. The processor may or may not choose to execute all related processes. The approach may mutate itself over the previous executions of the workflow. The mutating workflow may achieve better accuracies over time based on the specific contexts fed into the workflow. The outcome of the resultant process workflow may be unknown prior to processing. The workflow may have access to all the available processes for workflows described below.

The adaptive workflow is a derivative of the mutating workflow. The adaptive workflow may work in a similar manor except that its accuracy may be far greater than the mutating workflow. The accuracy may be improved by leveraging more advanced machine learning techniques with artificial neural networks in order to accomplish this level of accuracy. The outcome of the resultant process workflow may be unknown prior to processing. The workflow may have access to all the available processes for workflows described below.

The evolutionary workflow may be a derivative workflow from random, genetic, mutating, and adaptive. The evolutionary workflow may differ from these other workflows by the introduction of evolutionary algorithms both publicly available and proprietary in nature. The processor may leverage evolutionary algorithms to further improve the accuracy of the desired result as well as to predict future potential changes that may occur. The outcome of the resultant process workflow may be unknown prior to processing. The workflow may have access to all the available processes for workflows described below.

The fractal workflow may be modeled after fractal algorithms which endlessly and recursively drill into a context until reaching a desired state. The desired state may be iterative in nature, in that the processor may work in a hyperactive manor with the stimulus and reaction context and its source in order to achieve a better, yet different, level of accuracy. For example, the processor operating the fractal workflow may receive a context and process it accordingly. During the processing of the context, the processor may prompt the context source for additional information. The new information from the source may then be added to the original context to improve the accuracy of the result. The outcome of the resultant process workflow may be unknown prior to processing. The workflow may have access to all the available processes for workflows described below.

In 858, processor may select processes for the selected workflow. Processes may be used to isolate functions that may mimic how the human mind works at a basic level. For example, the ability to remember, learn, and recall information as humans normally would. These processes may be modeled after the high level functionality of our understanding of the human mind, but may be designed to work for machines rather than a physical brain. Example processes may include memorize, remember, learn, think, associate, hallucinate, and/or dream. In 860, processor may apply the processes.

FIG. 8B illustrates several example processes that the processor may select. The memorize process may store information in a memory of the system. The processor may perform analysis over the context received and, if prompted to memorize, processor may analyze the data stores related to the context to see how best to store the information. The memorization process may chose a number of different methods for storing this information. For example, related to multi-modal data stores, methods may include a relational database management system (RDBMS), key/value store, document store, graph store, or some other storage mechanism.

The remember process may recall information for the system. The method of remembering information may be different from a normal computer system in some embodiments. In standard systems, a file or entry is made into a file system or database. Normally an identifier is used to find this information at a later date. In the remember process, processor may use this method or may pattern match and give a predictive/assumed response for a given item. For example, if one were to prompt the system to remember "orange," the processor may respond with a picture of a fruit, a color swatch of orange, a picture of a monkey, or a blurb of a paragraph with the word orange within it. This may be dictated by the workflow executing the process.

The learn process may be used by the system for learning new information. In this process, processor may leverage a mixture of artificial neural networks, knowledge bases, and various algorithms (e.g. genetic) to identify and intake new information relevant to the stimulus.

The think process may allow the system to "ponder" over a context to determine if there is additional information related to the context that may be applicable as a response/reaction to a given stimulus. Processor may look for additional information and, depending on whether it finds additional information, processor may provide an output or not.

The associate, or association, process may be used to associate separate information to each other. Processor may use various algorithms that perform qualitative and quantitative analysis to create an association between one or more artifacts. In addition to this analysis, processor may leverage similar techniques to the learn process in order to determine if data should be associated or unassociated.

The dream and hallucinate processes may be similar to one another and may relate well to the think process. Much like the think process, these two processes may allow the system to "ponder" on information. However, these two processes may be more unstructured than the think process. The dream process may be used when the system is in idle or low usage status. During that time, processor may be allowed cycles to process, analyze, learn, remember, and associate information as it deems necessary. This process may be unstructured in nature; the intent is to allow the system to make sense of larger data sets that normally may not be interrelated. The dream process may be more structured in nature than the hallucination process. The hallucination process may be similar to the dream process except that it is exponentially more unstructured than the dream process. Hallucination may occur at any time whether the system is idle or not.

In 862, processor may create any reactions and/or concepts from stimulus. In 864, processor may send the reaction to stimulus source. In 866, self-learning may end.

Figure 9A:
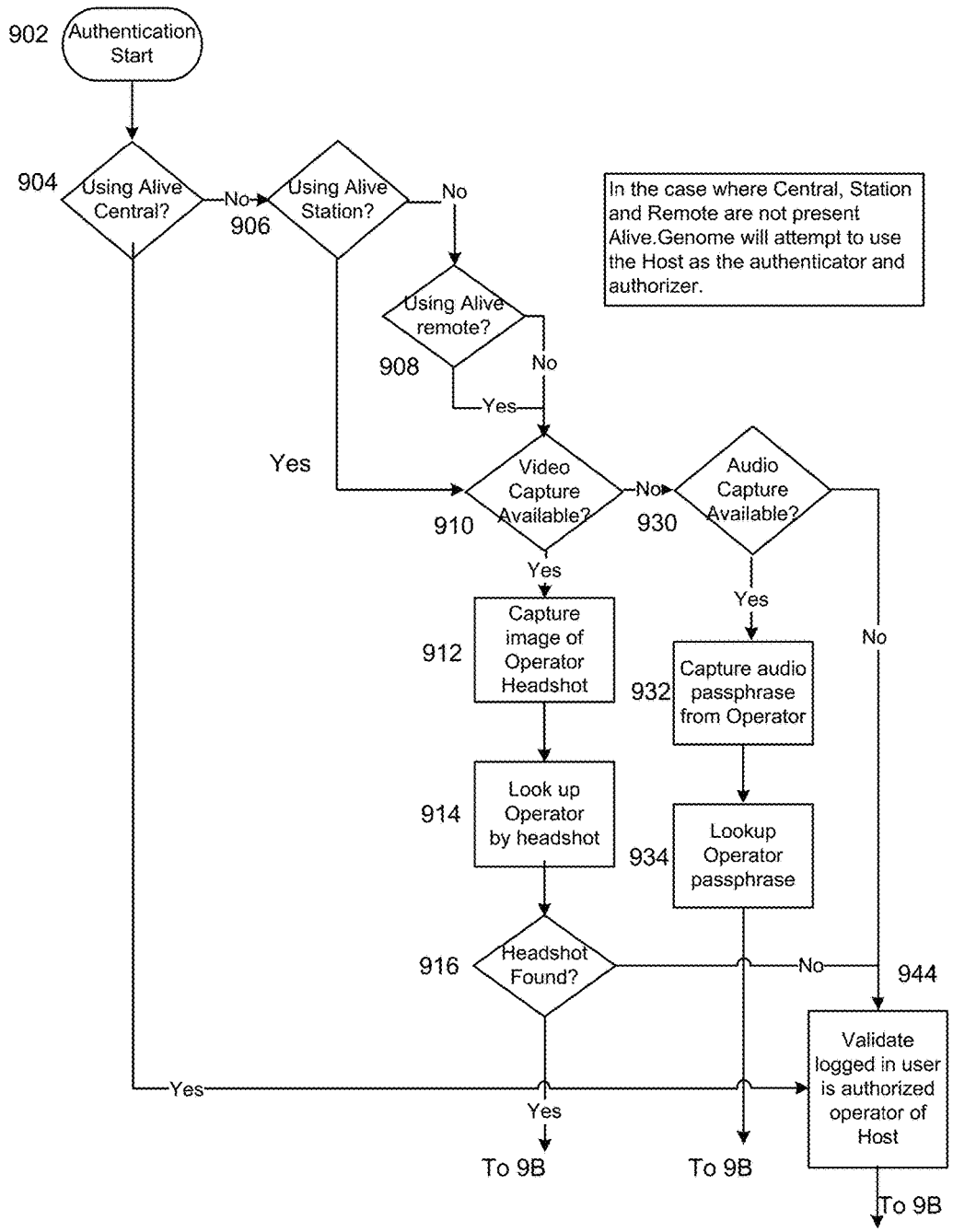
FIGS. 9A-9B show an authentication process according to an embodiment of the invention.
Figure 9B:
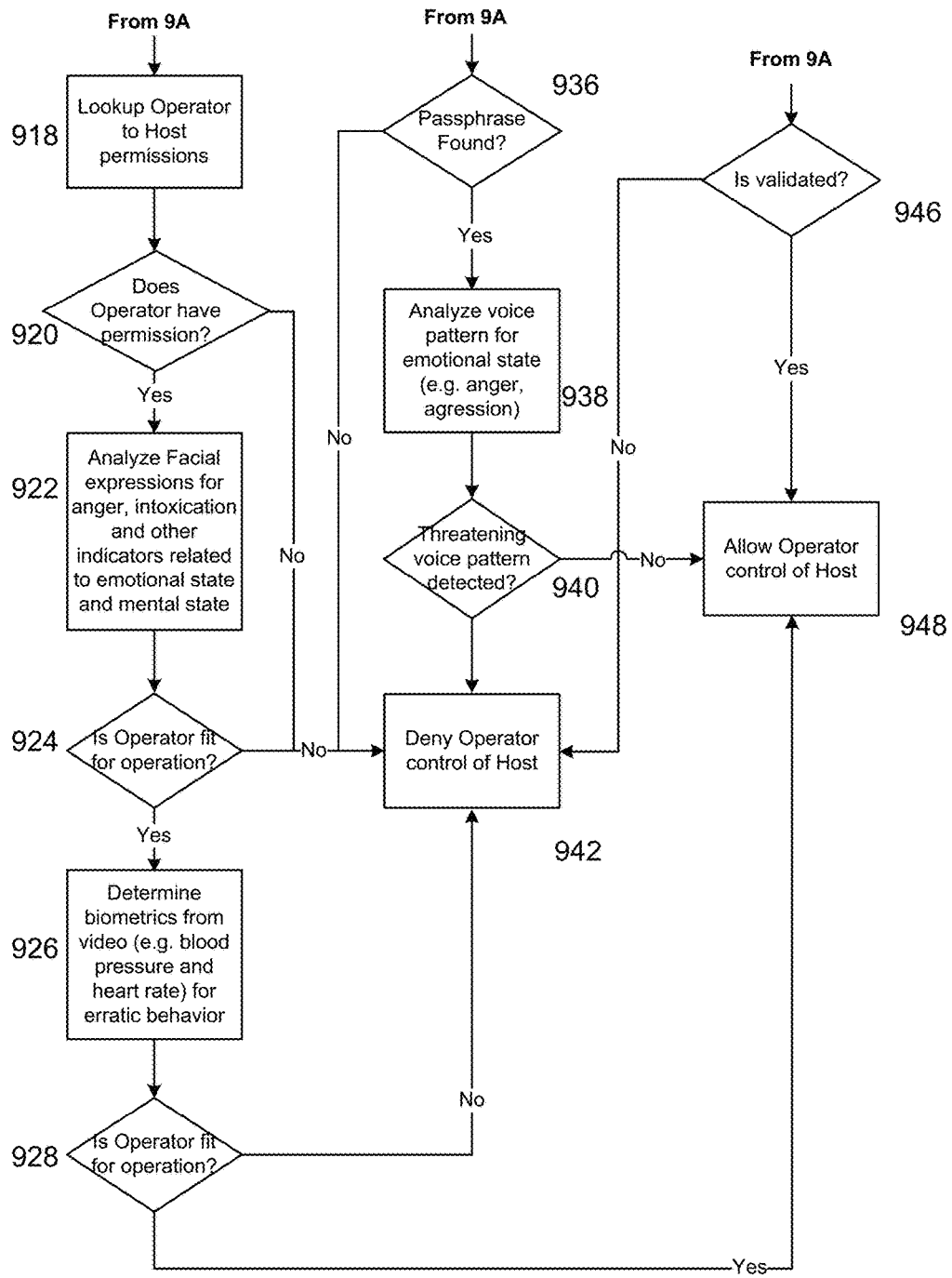

In some embodiments, safety and/or security concerns may encourage the placement of limitations on who may operate a drone in a given situation. FIGS. 9A-9B show an authentication process according to an embodiment of the invention wherein an operator is authenticated before being given control of a drone (or denied that control). Unless otherwise noted, the process may be performed by a processor of one or more cloud servers and/or local devices configured to interact with a drone or robot, as described above.

In 902, authentication may begin. In 904, processor may determine whether alive central is being used. If so, in 944, processor may validate whether the logged-in user is an authorized operator of a device. In 946, processor may determine outcome of validation. If the user is validated, in 948, processor may allow the user to control the device. If the user is not validated, in 942, processor may deny control of the device to the user.

If processor determines alive station is being used in 906 and/or if alive remote is being used in 908, authentication may proceed as follows. In 910, processor may determine whether video capture is available. If so, in 912, processor may capture an image of the operator using the video capture capabilities (e.g., camera and/or sensor). In 914, processor may look up the operator by headshot. In 916, processor may evaluate lookup result. If the headshot is not found, in 944, processor may validate whether the logged-in user is an authorized operator of a device. In 946, processor may determine outcome of validation. If the user is validated, in 948, processor may allow the user to control the device. If the user is not validated, in 942, processor may deny control of the device to the user.

If the headshot is found, in 918, processor may look up operator to host permissions for the user having the found headshot. In 920, processor may analyze lookup result to determine whether the operator has permission to operate the device. If not, in 942, processor may deny user control of the device. If the operator has permission, in 922, processor may analyze facial expressions for anger, intoxication, and/or other factors that may relate to emotional and/or mental state. In 924, processor may determine whether the analysis suggests the operator is fit for operation (e.g., a calm, sober user may be fit to operate the device, whereas an angry, drunk user may not be fit to operate the device). If the user is unfit, in 942, processor may deny user control of the device. If the user passes this test, in 926, processor may determine biometrics from video (e.g., blood pressure and/or heart rate) to detect erratic user behavior. In 928, processor may determine whether the analysis suggests the operator is fit for operation. If the user is unfit, in 942, processor may deny user control of the device. Otherwise, in 948, processor may allow the user to control the device.

In 930, if video is not available, processor may determine whether audio capture is available. If so, in 932, processor may capture an audio passphrase (e.g., spoken by the user). In 934, processor may look up the operator passphrase. In 936, processor may evaluate lookup result. If the passphrase is not found, in 942, processor may deny control of the device to the user. If the passphrase is found, in 938, processor may analyze voice pattern of passphrase or other audio for emotional state (e.g., anger or aggression). In 940, processor may determine whether the analysis suggests the operator is fit for operation (e.g., a threatening tone may indicate the user is not fit to operate the device). If the user is unfit, in 942, processor may deny user control of the device. Otherwise, in 948, processor may allow the user to control the device. If neither video nor audio capture is available, processing may proceed as described above for alive central authentication.

Figure 10:
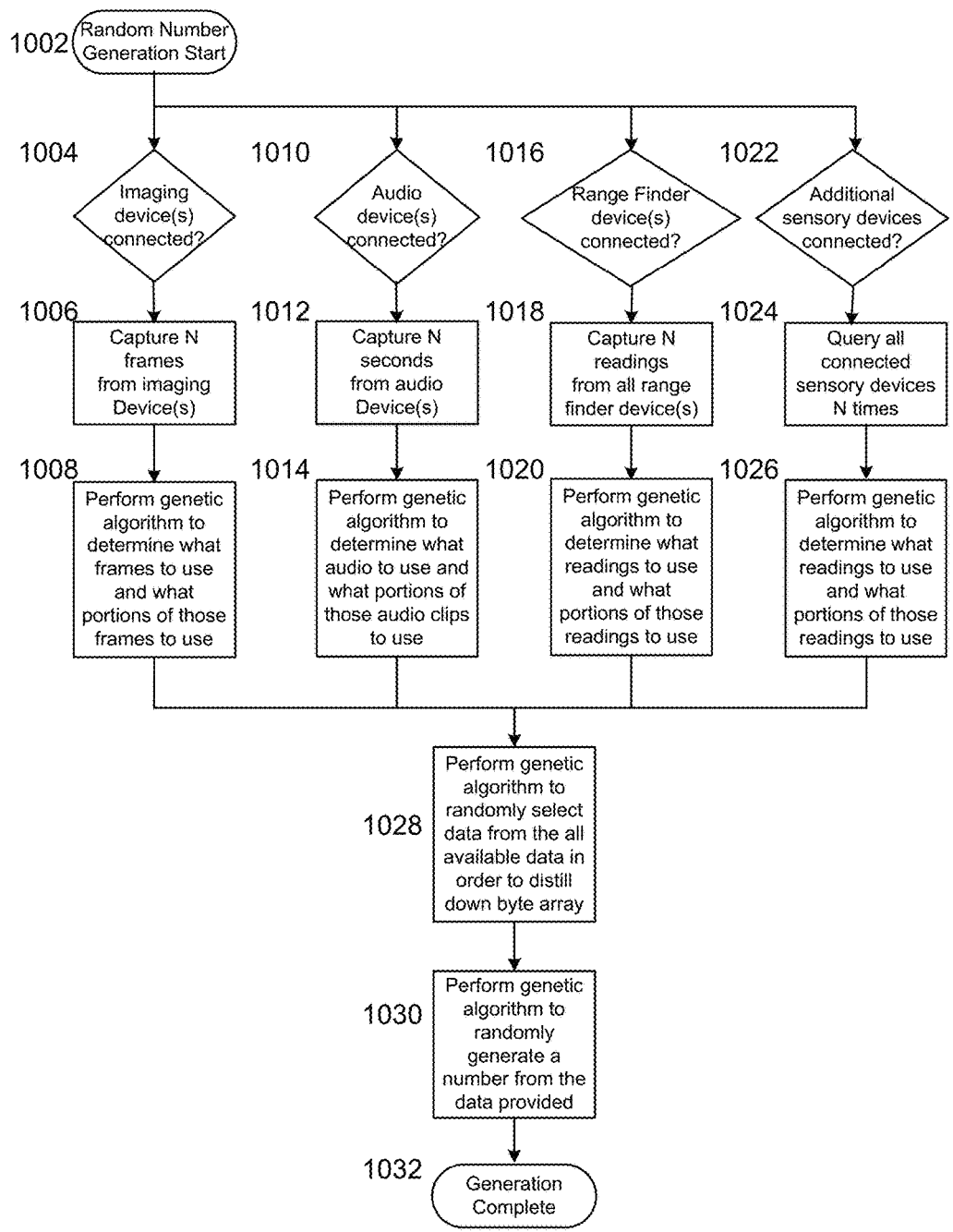
FIG. 10 shows a random number generation process according to an embodiment of the invention.

As noted above, the system may include random number generation features. FIG. 10 shows a random number generation process according to an embodiment of the invention. Unless otherwise noted, the processes may be performed by a processor of a drone or robot, as described above.

In 1002, random number generation may begin. Data from imaging devices, audio devices, range finder devices, other sensors, and/or combinations thereof may be used to generate random numbers.

In 1004, processor may determine whether an imaging device is connected. If so, in 1006, processor may capture N frames of input from imaging device. In 1006, processor may use a genetic algorithm to select frames and/or portions thereof.

In 1010, processor may determine whether an audio device is connected. If so, in 1012, processor may capture N seconds of input from audio device. In 1014, processor may use a genetic algorithm to select audio clips and/or portions thereof.

In 1016, processor may determine whether a range finder device is connected. If so, in 1018, processor may capture N readings from range finder device. In 1020 processor may use a genetic algorithm to select readings and/or portions thereof.

In 1022, processor may determine whether an additional sensing device is connected. If so, in 1024, processor may query the device N times. In 1026, processor may use a genetic algorithm to select sensor readings and/or portions thereof.

In any of the above cases, or using combinations thereof, in 1028, processor may use a genetic algorithm to randomly select data from the available data to create a data array. In 1030, processor may use a genetic algorithm to randomly generate a number from the selected data. In 1032, generation may end, and processor may make the randomly generated number available for use by other processes as described above.

APPENDIX

Appendix A is attached hereto and incorporated by reference herein. Appendix A provides various system implementation details, including descriptions of libraries, firmware, applications, databases, and hardware/software mapping in an embodiment of the invention. Appendix A also provides examples of the Alive Remote, Admin, and Alive Central user interfaces and flow diagrams of user interactions with various user interfaces. Those of ordinary skill in the art will understand that these are examples only, and that other technical configurations and/or UI configurations/flows may be possible.

CONCLUSION

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures that highlight the functionality and advantages are presented for example purposes only. The disclosed methodologies and systems are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims, and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A system configured to manage at least one robotic device, the system comprising:
   one or more databases; and
   one or more processors in communication with the one or more databases, the one or more processors being configured to:
      provide an operating system for the at least one robotic device;
      control motion of the at least one robotic device;
      configure at least one sensor removably coupled to the at least one robotic device;
      process data collected by the at least one sensor; and
      perform localization and/or area mapping for the at least one robotic device by a process comprising analyzing data collected by the at least one sensor to generate localization and/or area mapping data by:
         detecting a positional sound; and
         determining a direction of the positional sound.

2. The system of claim 1, wherein the at least one robotic device comprises a land-based drone or robot, an air-based drone or robot, a sea-based drone or robot, a space-based drone or robot, or a combination thereof.

3. The system of claim 1, wherein:
   at least one of the one or more databases and the one or more processors is disposed in at least one server;
   at least one of the one or more databases and the one or more processors is disposed in at least one computer in communication with the at least one server and the at least one robotic device;
   at least one of the one or more databases and the one or more processors is disposed in the at least one robotic device; or
   a combination thereof.

4. The system of claim 1, wherein:
   the at least one sensor comprises at least one plug and play sensor; and
   the one or more processors are configured to configure the at least one plug and play sensor upon detecting a change in a sensor configuration of the at least one robotic device during operation of the at least one robotic device.

5. The system of claim 1, wherein the one or more processors are configured to process the data collected by the at least one sensor by performing a process comprising:
   identifying object data within the data collected by the at least one sensor; and
   storing the object data in the at least one database.

6. The system of claim 1, wherein the one or more processors are configured to process the data collected by the at least one sensor by performing a process comprising:
   contextualizing the data collected by the at least one sensor to generate data comprising a meaning; and
   storing the data comprising the meaning in the at least one database.

7. The system of claim 1, wherein the one or more processors are configured to process the data collected by the at least one sensor by performing a process comprising:
   determining a machine learning workflow to process the data collected by the at least one sensor;
   selecting and arranging, based on the machine learning workflow, at least one of a plurality of machine learning processes;
   processing the data collected by the at least one sensor according to the selected and arranged at least one machine learning process to generate a machine learning result; and
   storing the machine learning result in the at least one database.

8. The system of claim 7, further comprising:
   adding the localization and/or area mapping data to an internal map; and storing the internal map in the at least one database.

9. The system of claim 1, wherein the analyzing the data collected by the at least one sensor to generate the localization and/or area mapping data comprises:
   comparing the data collected by the at least one sensor with data in the at least one database to determine distance to an object based on an observed object size;
   processing a range finder reading;
   processing a touch sensor reading; or
   a combination thereof.

10. The system of claim 1, wherein:
    the at least one robotic device comprises a single camera; and
    the analyzing the data collected by the at least one sensor to generate the localization and/or area mapping data comprises comparing the data collected by the single camera with data in the at least one database to determine distance to an object based on an observed object size.

11. The system of claim 1, wherein the one or more processors are further configured to generate, using the data collected by the at least one sensor as a seed, a random number.

12. The system of claim 1, further comprising one or more additional robotic skin sensors removably coupled to the at least one robotic device, wherein the one or more processors is further configured to update the localization and/or area mapping data by:
    querying the one or more additional robotic skin sensors for additional sensor data; and
    updating the localization and/or area mapping data based on the additional sensor data;
    wherein the additional sensor data comprises one or more of points of heat and points of moisture on the at least one robotic device.

13. A method for managing at least one robotic device, the method comprising:
    providing, by one or more processors in communication with the one or more databases, an operating system for the at least one robotic device;
    controlling, by the one or more processors, motion of the at least one robotic device;

configuring, by the one or more processors, at least one sensor removably coupled to the at least one robotic device;

processing, by the one or more processors, data collected by the at least one sensor; and performing, by the one or more processors, localization and/or area mapping for the at least one robotic device by a process comprising analyzing data collected by the at least one sensor to generate localization and/or area mapping data, wherein analyzing the data collected by the at least one sensor comprises:
  detecting a positional sound; and
  determining a direction of the positional sound.

14. The method of claim 13, wherein the at least one robotic device comprises a land-based drone or robot, an air-based drone or robot, a sea-based drone or robot, a space-based drone or robot, or a combination thereof.

15. The method of claim 13, wherein:
  at least one of the one or more databases and the one or more processors is disposed in at least one server;
  at least one of the one or more databases and the one or more processors is disposed in at least one computer in communication with the at least one server and the at least one robotic device;
  at least one of the one or more databases and the one or more processors is disposed in the at least one robotic device; or
  a combination thereof.

16. The method of claim 13, wherein the at least one sensor comprises at least one plug and play sensor, the method further comprising configuring, by the one or more processors, the at least one plug and play sensor upon detecting a change in a sensor configuration of the at least one robotic device during operation of the at least one robotic device.

17. The method of claim 13, wherein processing the data collected by the at least one sensor comprises:
  identifying object data within the data collected by the at least one sensor; and
  storing the object data in the at least one database.

18. The method of claim 13, wherein processing the data collected by the at least one sensor comprises:
  contextualizing the data collected by the at least one sensor to generate data comprising a meaning; and
  storing the data comprising the meaning in the at least one database.

19. The method of claim 13, wherein processing the data collected by the at least one sensor comprises:
  determining a machine learning workflow to process the data collected by the at least one sensor;
  selecting and arranging, based on the machine learning workflow, at least one of a plurality of machine learning processes;
  processing the data collected by the at least one sensor according to the selected and arranged at least one machine learning process to generate a machine learning result; and
  storing the machine learning result in the at least one database.

20. The method of claim 13, wherein the analyzing the data collected by the at least one sensor to generate the localization and/or area mapping data comprises:
  comparing the data collected by the at least one sensor with data in the at least one database to determine distance to an object based on an observed object size;
  processing a range finder reading;
  processing a touch sensor reading; or
  a combination thereof.

21. The method of claim 20, further comprising:
  adding, by the one or more processors, the localization and/or area mapping data to an internal map; and
  storing the internal map in the at least one database.

22. The method of claim 13, wherein:
  the at least one robotic device comprises a single camera; and
  the analyzing the data collected by the at least one sensor to generate the localization and/or area mapping data comprises comparing the data collected by the single camera with data in the at least one database to determine distance to an object based on an observed object size.

23. The method of claim 13, further comprising generating, by the one or more processors, using the data collected by the at least one sensor as a seed, a random number.

24. The method of claim 13, further comprising updating the localization and/or area mapping data by:
  querying one or more additional robotic skin sensors removably coupled to the at least one robotic device for additional sensor data; and
  updating the localization and/or area mapping data based on the additional sensor data;
  wherein the additional sensor data comprises one or more of points of heat and points of moisture on the at least one robotic device.

* * * * *